United States Patent [19]
Luken, Jr.

[11] Patent Number: 5,278,948
[45] Date of Patent: Jan. 11, 1994

[54] PARAMETRIC SURFACE EVALUATION METHOD AND APPARATUS FOR A COMPUTER GRAPHICS DISPLAY SYSTEM

[75] Inventor: William L. Luken, Jr., Ulster Park, N.Y.

[73] Assignee: International Business Machines Corporation, Armonk, N.Y.

[21] Appl. No.: 933,602

[22] Filed: Aug. 21, 1992

Related U.S. Application Data

[63] Continuation of Ser. No. 426,386, Oct. 24, 1989, abandoned.

[51] Int. Cl.$^5$ ............................................. G06F 15/72
[52] U.S. Cl. ................................... 395/123; 395/127; 395/163
[58] Field of Search .............. 395/120, 123, 126, 127, 395/163

[56] References Cited

U.S. PATENT DOCUMENTS

| | | | |
|---|---|---|---|
| 4,646,251 | 2/1987 | Hayes et al. | 395/123 |
| 4,819,192 | 4/1989 | Kuragano et al. | 395/127 X |
| 4,855,935 | 8/1989 | Lien et al. | 364/521 |
| 4,912,659 | 3/1990 | Liang | 395/123 X |
| 4,930,092 | 5/1990 | Reilly | 395/123 |
| 4,999,789 | 3/1991 | Fiasconaro | 395/127 |
| 5,038,291 | 8/1991 | Wang et al. | 395/120 |

FOREIGN PATENT DOCUMENTS

| | | | |
|---|---|---|---|
| 0314335 | 3/1988 | European Pat. Off. | G06F 15/72 |
| 0277832 | 10/1988 | European Pat. Off. | G09G 1/06 |

OTHER PUBLICATIONS

Piegl et al., "Curve and Surface Constructions Using Rational B-Splines", Computer Aided Design, Col. 19, No. 9, Nov. 1987, pp. 485–498.

Primary Examiner—Mark K. Zimmerman
Attorney, Agent, or Firm—William A. Kinnaman, Jr.; Mark S. Walker

[57] ABSTRACT

A method and apparatus for evaluating and rendering parametric surfaces. The apparatus includes a system memory connected to a graphics control processor, which is connected to local memory, and then connected in a pipelined arrangement to a plurality of parallel floating point processors, another floating point processor, a clipping processor and a frame buffer. The method includes: reading data from system memory and storing said data in local memory and/or registers within the graphics control processor; defining a control point stack containing kv by Nu transformed control points; multiplying the control points by a corresponding weight; evaluating the v dependence of homogeneous coordinates (wx,wy,wz,w) for successive parameter points separated by a v parameter interval; simultaneously within each parallel floating point processor evaluating the b-spline functions for one component of the coordinate set (wx,wy,wz,w) at successive u parameter points to obtain a top and bottom u coordinate, a top and bottom u derivative, and a top and bottom v derivative; eliminating the weight from each said coordinate yielding the geometric coordinates, and using the corresponding u and v derivatives to determine the geometric u and v tangents for a top and bottom point of an associated u value and therefrom the normal vector; clipping the polygon to the current viewing boundaries; and producing the shaded images of the polygon.

25 Claims, 21 Drawing Sheets

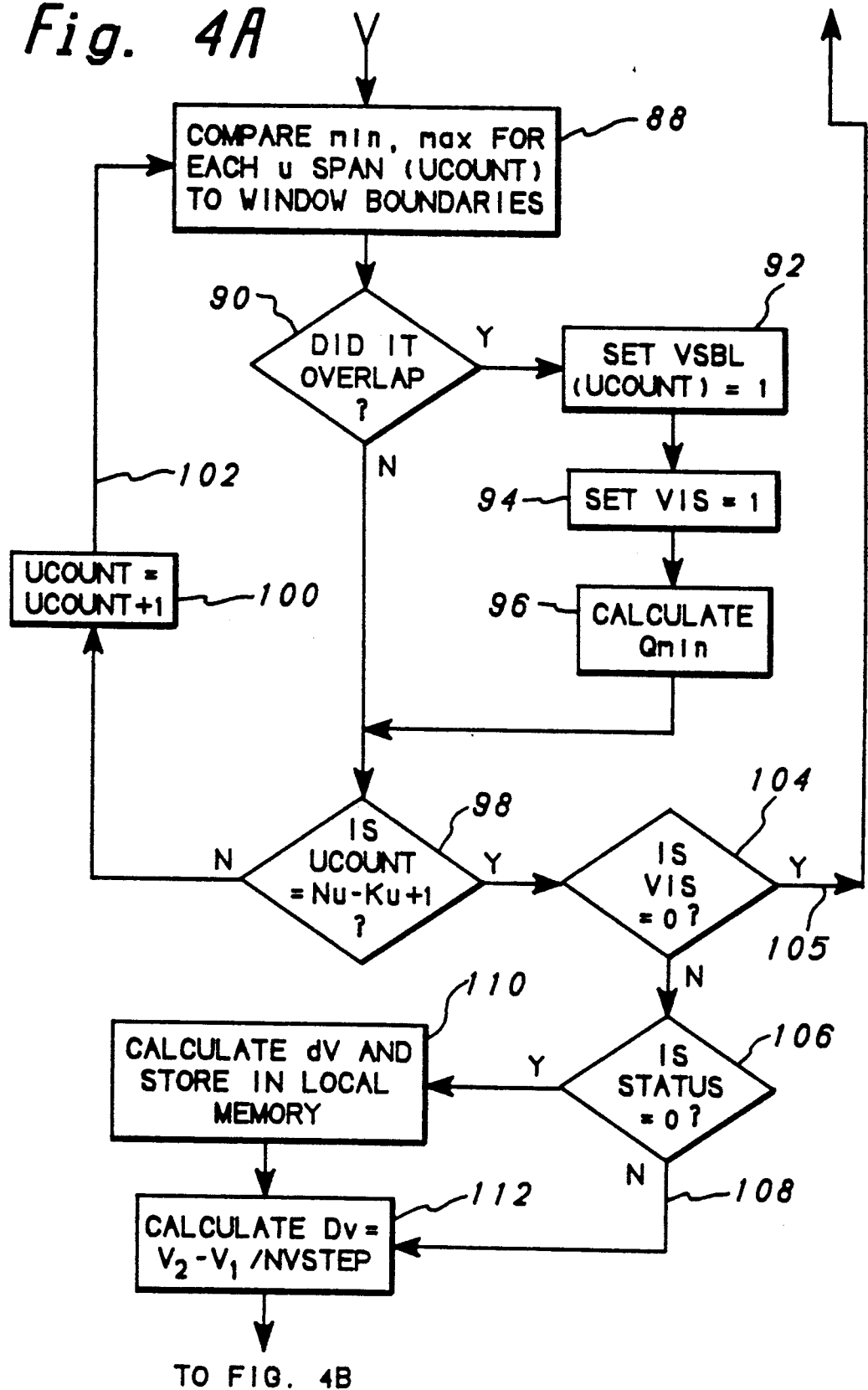

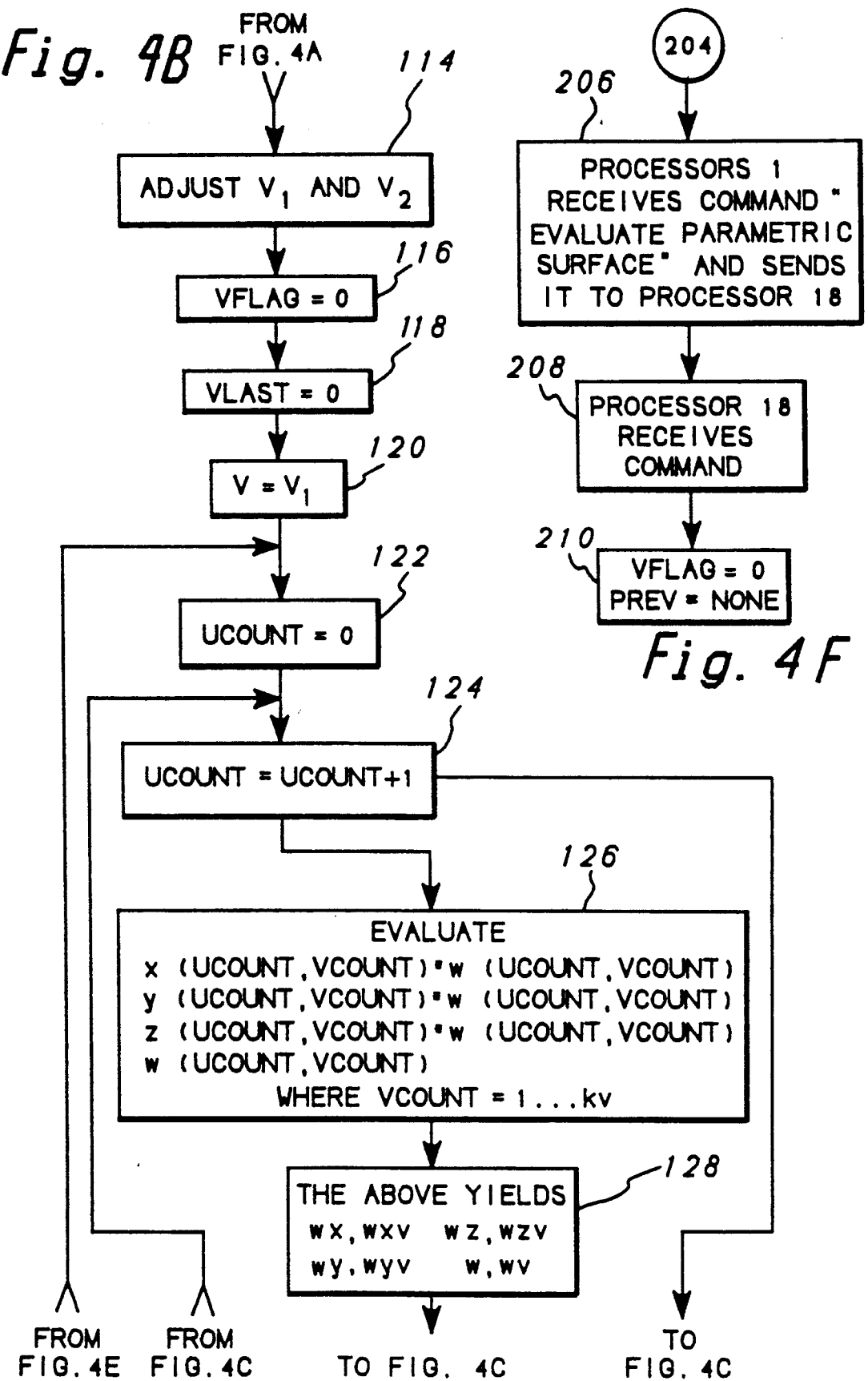

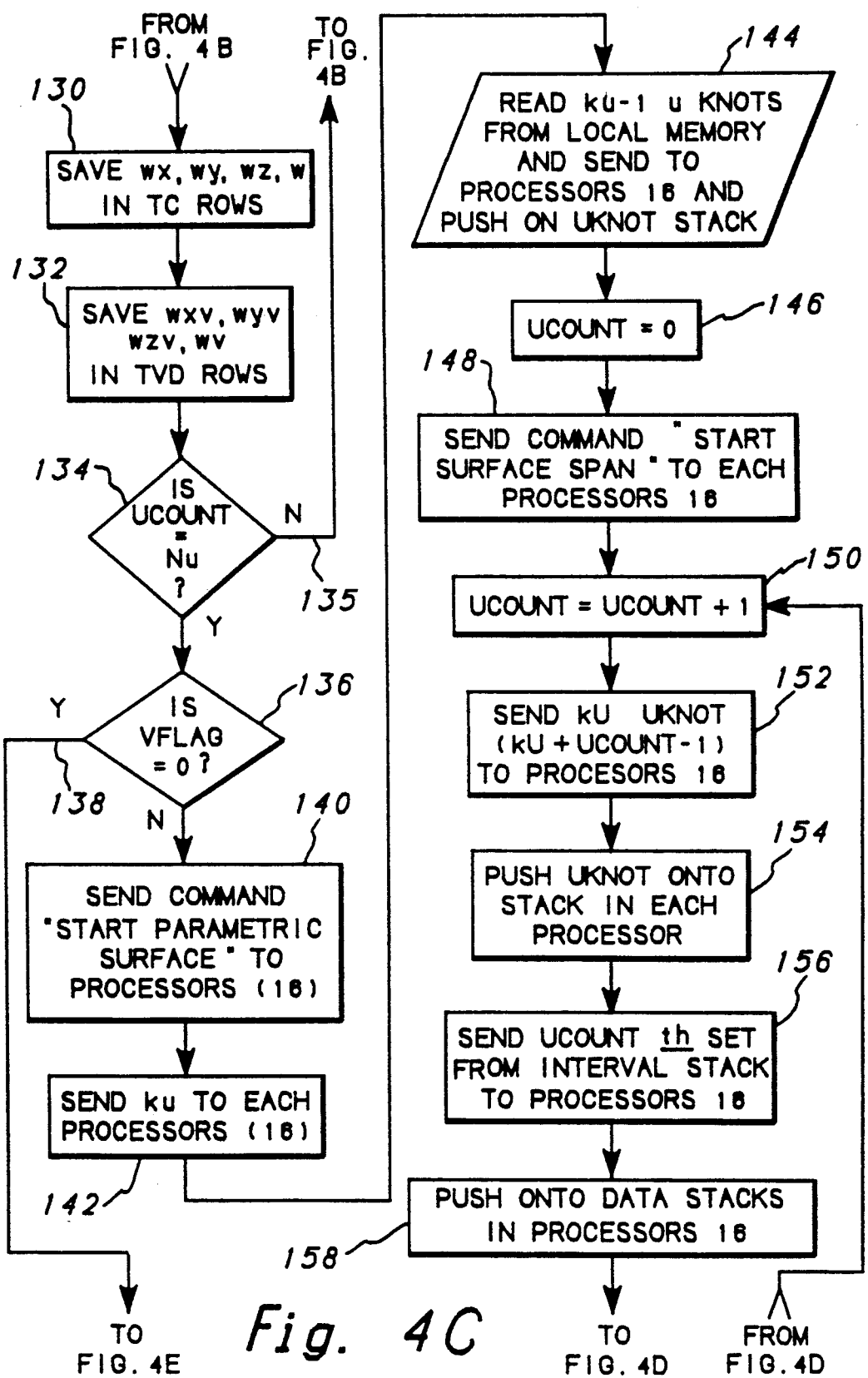

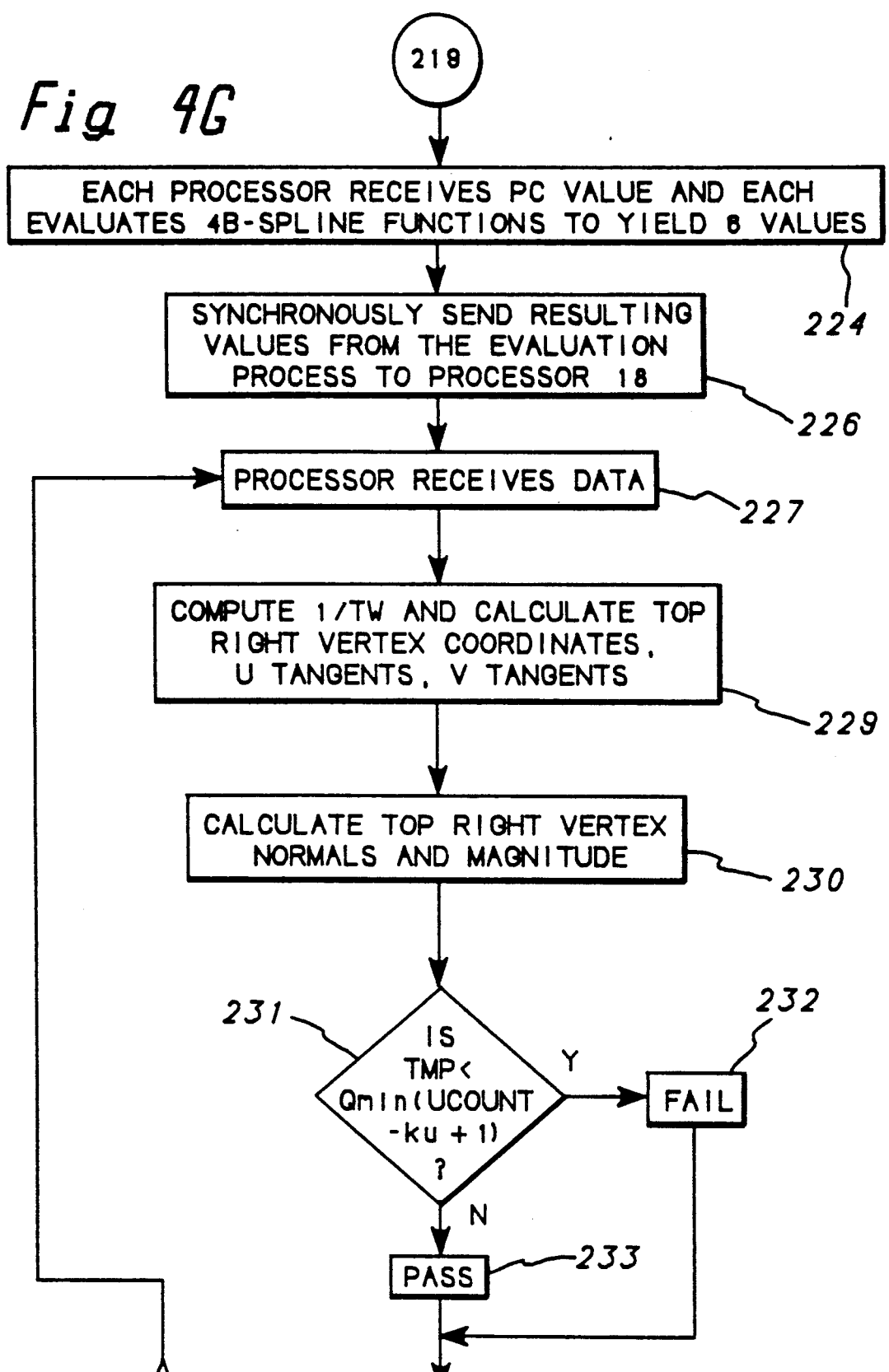

1 U SPAN WHERE ku = 3

1 V SPAN WHERE kv = 4

Fig. 10A
| | | | | | | | | |
|---|---|---|---|---|---|---|---|---|
| TC<br>TVD | $x_1$<br>$x_1v$ | $y_1$<br>$y_1v$ | $z_1$<br>$z_1v$ | $w_1$<br>$w_1v$ | ... | $x_8$<br>$x_8v$ | $y_8$<br>$y_8v$ | $z_8$<br>$z_8v$ | $w_8$<br>$w_8v$ |
| BC<br>BVD | | | | | | | | | |
Fig. 10B
| | | | | | | | | |
|---|---|---|---|---|---|---|---|---|
| TC<br>TVD | $x_1$<br>$x_1v$ | $y_1$<br>$y_1v$ | $z_1$<br>$z_1v$ | $w_1$<br>$w_1v$ | ... | $x_8$<br>$x_8v$ | $y_8$<br>$y_8v$ | $z_8$<br>$z_8v$ | $w_8$<br>$w_8v$ |
| BC<br>BVD | $x_1$<br>$x_1v$ | $y_1$<br>$y_1v$ | $z_1$<br>$z_1v$ | $w_1$<br>$w_1v$ | ... | $x_8$<br>$x_8v$ | $y_8$<br>$y_8v$ | $z_8$<br>$z_8v$ | $w_8$<br>$w_8v$ |
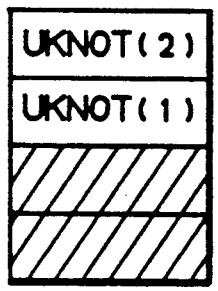
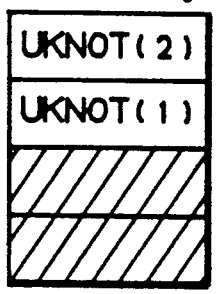
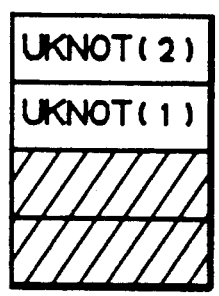
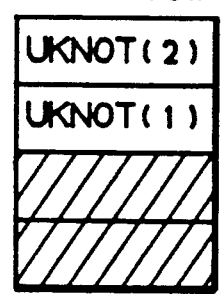
Fig. 11

Fig. 12

| 18x | $x_1$TC | $x_1$TVD | $x_1$BC | $x_1$BVD |
|---|---|---|---|---|
| | | | | |
| | | | | |
| | | | | |

| 18y | $y_1$TC | $y_1$TVD | $y_1$BC | $y_1$BVD |
|---|---|---|---|---|
| | | | | |
| | | | | |
| | | | | |

| 18z | $z_1$TC | $z_1$TVD | $z_1$BC | $z_1$BVD |
|---|---|---|---|---|
| | | | | |
| | | | | |
| | | | | |

| 18w | $w_1$TC | $w_1$TVD | $w_1$BC | $w_1$BVD |
|---|---|---|---|---|
| | | | | |
| | | | | |
| | | | | |

PARAMETRIC SURFACE EVALUATION METHOD AND APPARATUS FOR A COMPUTER GRAPHICS DISPLAY SYSTEM

CROSS-REFERENCE TO RELATED APPLICATION

This application is a continuation of application Ser. No. 07/426,386, filed Oct. 24, 1989, now abandoned.

BACKGROUND OF THE INVENTION

1. Field of the Invention

This invention relates generally to the field of computer graphics, and more specifically to an apparatus and method for evaluating and rendering parametric surfaces.

2. Background Art

The evolution of computer technology has resulted in the creation of a sophisticated technical art devoted to the representation of graphical information generated by computers. This art is referred to as computer graphics. In recent years, the use of 3-dimensional computer graphics in scientific and engineering applications has increased, along with the demand for realistic images.

Besides lines, markers and polygons, computer graphics displays today support more general geometric primitives, such as parametric surfaces. However, the methods used, at present, for evaluating and rendering such surfaces in computer graphics display systems are often inefficient and require complicated and extensive external control logic.

It is known that parametric surfaces can be represented in b-spline form and others have attempted, in the past, to evaluate and render surfaces therefrom. For example, a conventional CAD/CAM application uses a graphics workstation by sending down polygons which make up objects stored in the host computer data base, rather than the b-spline surface form data stored in the data base. According to this procedure, the host computer decomposes the spline surface into flat polygons, and then sends the polygons to the graphics workstation for conventional processing and subsequent display. This procedure is inefficient and fails to take advantage of the many attractive attributes of the b-splines.

Commonly assigned U.S. patent application Ser. No. 07/115,465, filed Oct. 30, 1987 now U.S. Pat. No. 4,912,659, describes a parallel pipeline surface processing system which decomposes non-uniform rational b-spline (NURBS) surfaces into rational Bezier patches for subsequent processing. This processing by patch approach requires computational resources for the decomposition step and risks the appearance of artifacts (e.g. pin holes or rips) in the surface rendered on the screen.

None of the known prior art approaches fully capitalize on NURBS data in evaluating and rendering parametric surfaces. Accordingly, a need exists for a method and apparatus for evaluating and rendering NURBS data representative of a parametric surface, in an efficient, accurate and rapid fashion. The proposed PHIGS (Programmer's Hierarchical Interactive Graphics Standard) PLUS standard for interactive 3-dimensional graphics, supports the definition of surfaces in terms of NURBS and, thus, reinforces this need.

SUMMARY OF THE INVENTION

This need is satisfied and additional benefits realized, in accordance with the principles of the present invention, by the provision of a surface evaluation system which divides a surface extending along orthogonal u and v parametric coordinates into a sequence of strips determined by tessellation of the v parameter. Each strip is characterized by two successive v parameter values, the current or top value and the previous or bottom value. The top of each strip becomes the bottom of the succeeding strip. A graphics control processor determines how to tessellate the v parameter for each v span of the surface and evaluates the v dependence and v derivatives along the top and bottom of each strip. The resulting homogeneous coordinates and v derivatives for the top and bottom of each strip are passed to four parallel floating point processors. The graphics control processor determines how to tessellate the u parameter for each u span of a strip and sends a sequence of u parameter values to the floating point processors. For each u parameter value, the floating point processors, operating in parallel, evaluate the u dependence of the top and bottom coordinates, the u derivatives of these coordinates, and the u dependence of the corresponding v derivatives. The resulting values are passed sequentially to a further floating point processor which converts them to a set of geometric coordinates and an associated vertex normal for a pair of points, one on the top and the other on the bottom of the strip, for each u parameter value. Two successive pairs define a 4-sided polygon for subsequent rendering. The above process is repeated for each successive strip of the surface.

In a more particular aspect of the present invention, the graphics control processor employs a FIFO control point stack having kv rows and Nu columns (where kv is the v parameter order and Nu is the u parametric dimension) to store kv rows of control points defining an initial v span. Subsequent v spans are defined by loading a subsequent individual row of control points into the top of the FIFO, each successive v span being defined by a corresponding successive row of control points and the immediately preceding kv-1 rows.

In accordance with another aspect of the invention, an initial u span of the surface is defined by the initial ku columns of the FIFO stack and each successive u span is defined by a corresponding successive column in conjunction with the immediately preceding ku-1 columns.

In accordance with a further aspect of the invention, the graphics control processor transforms control points data from modelling coordinates to view coordinates and multiplies the transformed coordinates by a weight w to obtain homogeneous coordinates.

In a preferred embodiment of the invention, evaluation is performed in accordance with a Cox-DeBoor process. One of the parallel floating point processors provides a weight output for each u parameter point evaluated and the further floating point processor calculates the reciprocal of the weight and multiplies the reciprocal by the outputs of the three remaining parallel point processors. A clipping processor and frame buffer can advantageously be arranged in series with the output of the further floating point processor and operate in pipeline fashion therewith.

The apparatus and method for evaluating and rendering parametric surfaces based on NURBS, of the present invention, offers many advantages including high performance, good numerical stability, cost effectiveness, high speed and accuracy, compatibility with the proposed PHIGS PLUS standard, the elimination of data redundancy, the avoidance of artifacts such as pinholes or rips in the rendered surface, and the possibility of traversal time tessellation in which the sets of polygons chosen to represent each surface may be optimized to meet the instantaneous presentation requirements of the surface. Further, the present invention allows a computer graphics display system to fully capitalize on the inherent characteristics and advantages of NURBS, including such features as the ability to construct complex surfaces using low order NURBS, local control, the convex hull property, the ability to render quadric surfaces accurately using weights, invariance with respect to coordinate transformations and significant data compression. These and other aspects, features and advantages of the present invention will be more readily understood from the subsequent detailed description.

BRIEF DESCRIPTION OF THE DRAWINGS

The subject matter which is regarded as the invention is particularly pointed out and distinctly claimed in the concluding portion of the specification. The invention, however, both as to apparatus and process, may best be understood by reference to the following detailed description taken in conjunction with the accompanying drawings in which:

FIGS. 8A and 8B are illustrations of a control point stack at various stages of operations;

FIGS. 10A and 10B are illustrations of the v interval stack at various stages of operation;

FIG. 11 illustrates a u knot stack within each parallel processor;

FIG. 12 illustrates a data stack containing top and bottom coordinates and derivatives within each parallel processor.

DETAILED DESCRIPTION OF THE INVENTION

This invention relates to a system for producing shaded images of parametric surfaces based on non-uniform rational b-splines (NURBS) using parallel and pipelined processors to obtain high performance. For an extensive review of the related terms and mathematics, see "An Introduction to Splines for Use in Computer Graphics & Geometric Modelling" by R. H. Bartels, J. C. Beatty, and B. A. Barsky (Morgan Kaufman, 1987).

Figure 1:
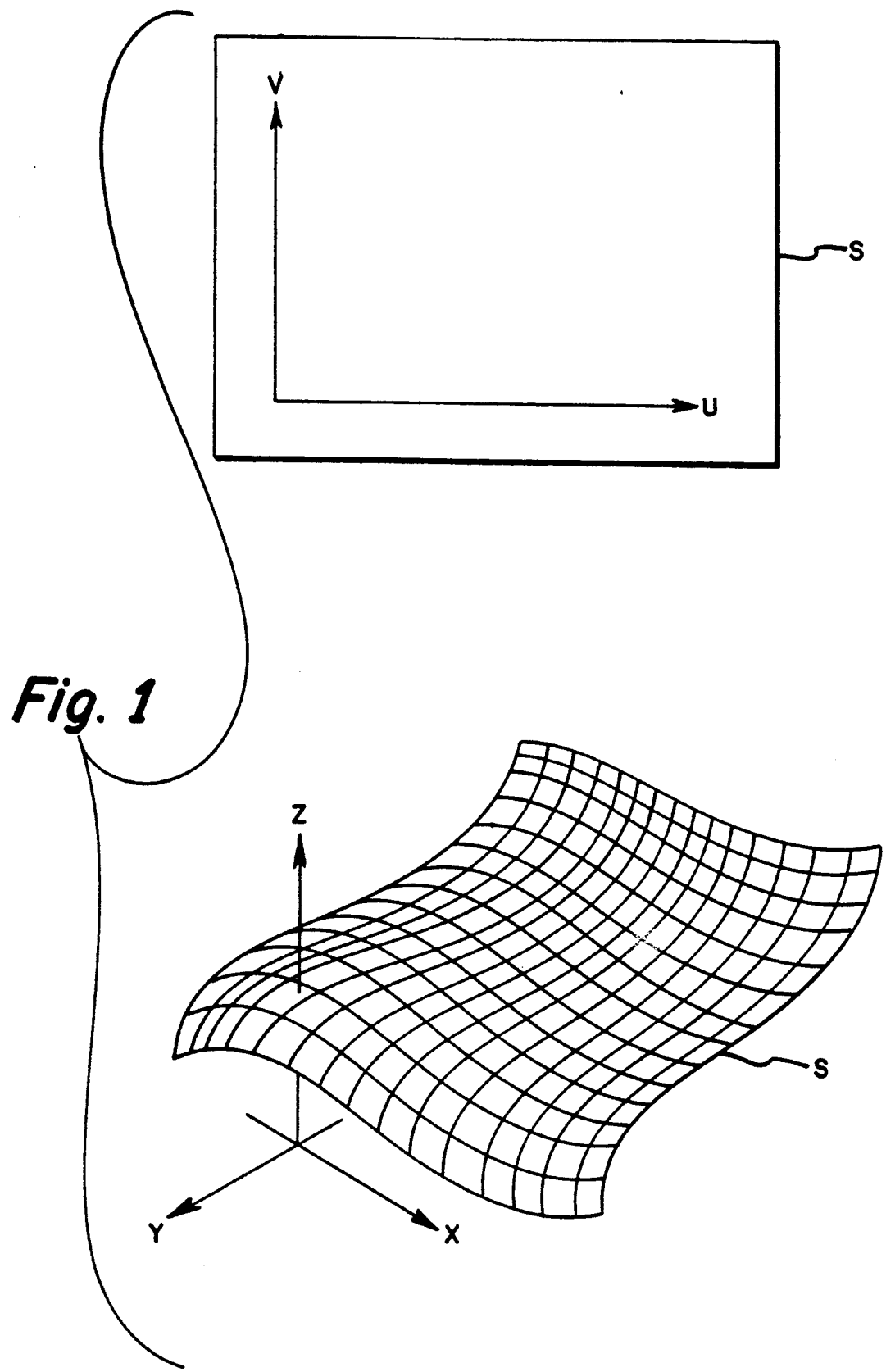
FIG. 1 is an illustration of a NURBS surface in x,y,z coordinate space and in parametric space.

Briefly, non-uniform rational b-splines (NURBS) are a class of parametric functions, which are used to represent parametric surfaces. A NURBS surface consists of a two-dimensional rectangular surface which may be bent, stretched, and twisted to form a 3-dimensional shape. FIG. 1 is an illustration of an untrimmed parametric surface, s, in x, y, z coordinate space. The insert in FIG. 1 depicts the internal parametric coordinates of the same surface s.

NURBS surfaces depend on parametric coordinates (u,v), which increase monotonically as one moves from one edge of a surface to the opposite edge. These parametric coordinates are in addition to the geometric coordinates (x,y,z). Therefore, for surfaces we have:

$$x = X(u,v),$$

$$y = Y(u,v), \text{ and}$$

$$z = Z(u,v)$$

for $U_{min} \leq u \leq U_{max}$, and $V_{min} \leq v \leq V_{max}$.

Parametric surfaces may also be defined in terms of simple polynomials, and any such parametric polynomial function may be represented exactly by a corresponding NURBS function.

NURBS surfaces may be defined in either rational or non-rational forms. In the non-rational form, each component (x,y,z) of a NURBS surface may be determined by evaluating a polynomial function of the parametric coordinates:

$$X(u,v) = \sum_{i=0}^{mu} \sum_{j=0}^{mv} c_{xij} u^i v^j,$$

$$Y(u,v) = \sum_{i=0}^{mu} \sum_{j=0}^{mv} c_{yij} u^i v^j, \text{ and}$$

$$Z(u,v) = \sum_{i=0}^{mu} \sum_{j=0}^{mv} c_{zij} u^i v^j$$

In the rational form, there is an additional function called the weight:

$$w(u,v) = \sum_{i=0}^{mu} \sum_{j=0}^{mv} c_{wij} u^i v^j.$$

In this case, the geometric coordinates are determined by ratios of polynomials:

$$X(u,v) = WX(u,v)/W(u,v)$$

$$Y(u,v) = WY(u,v)/W(u,v)$$

$$Z(u,v) = WZ(u,v)/W(u,v)ps$$

where WX(u,v), WY(u,v), WZ(u,v) are polynomials similar to those which specify X(u,v), Y(u,v) and Z(u,v) for the non-rational case.

Each NURBS surface, may be characterized by the degrees mu and mv corresponding to the highest powers of the parametric coordinates, and the orders ku and kv, which equal mu+1 and mv+1, respectively corresponding to the number of linearly independent terms in a polynomial of degrees mu and mv. Thus, for example, a quadratic function, $ax^2+bx+c$, has a degree 2 and order 3.

A NURBS function may be represented by multiple sets of coefficients, each of which is valid only for a limited range of the parametric coordinate. Thus, a surface may be divided into a set of patches, each represented by different polynomials. The first patch is defined by parametric values u running from $u_0$ to $u_1$, and v running from $v_0$ to $v_1$, and the coordinates of this portion of the surface are determined by the polynomials:

$$X_{11}(u,v) = \sum_{i=0}^{mu} \sum_{j=0}^{mv} c_{x11ij} u^i v^j,$$

$$Y_{11}(u,v) = \sum_{i=0}^{mu} \sum_{j=0}^{mv} c_{y11ij} u^i v^j, \text{ and}$$

$$Z_{11}(u,v) = \sum_{i=0}^{mu} \sum_{j=0}^{mv} c_{z11ij} u^i v^j, \text{ and}$$

The second patch is defined by parametric values u running from $u_1$ and $u_2$ and v running from $v_0$ to $v_1$, and the coordinates of this portion of the curve are determined by the polynomials $$X_{21}(u,v) = \sum_{i=0}^{mu} \sum_{j=0}^{mv} c_{x21ij} u^i v^j,$$

$$Y_{21}(u,v) = \sum_{i=0}^{mu} \sum_{j=0}^{mv} c_{y21ij} u^i v^j, \text{ and}$$

$$Z_{21}(u,v) = \sum_{i=0}^{mu} \sum_{j=0}^{mv} c_{z21ij} u^i v^j$$

and so forth.

NURBS are determined by control points, weights, and knot vectors. The control points provide the primary control over the geometry of a surface. A surface has an Nu by Nv matrix of control points, where Nu must be greater than or equal to the order (ku) of the u parameter, and Nv must be greater than or equal to the order kv of the v parameter. A surface is composed of a set of patches and each patch is determined by a ku by kv subset of the Nu by Nv matrix of control points. The Nu by Nv control points matrix determines the general shape of the surface, but the surface usually does not pass through these points.

The weight values are used to define the rational form of the NURBS surfaces. In the rational form, a weight (w) is associated with each of the coordinates (x,y,z) of the control points. The weights and coordinates are combined to form the homogeneous coordinates (wx,wy,wz,w), which define the control points for a set of four parametric polynomial functions, WX(u,v), WY(u,v), WZ(u,v), and W(u,v). The resulting geometric coordinates are determined by the ratios:

$$X(u,v) = WX(u,v)/W(u,v)$$

$$Y(u,v) = WY(u,v)/W(u,v)$$

$$Z(u,v) = WZ(u,v)/W(u,v)$$

The weights are required to be positive and greater than zero. The values of the weights are usually close to unity, and the rational form reduces to the non-rational form if the weights are all equal.

The knot vectors for a surface define a partitioning of the parameter space for the parametric coordinates (u,v). A surface has a knot vector and a sequence of spans for each parametric coordinate (u,v). The knot vector for the u order (ku) with Nu control points will have Nu+ku components, and the knot vector for the v order (kv) with Nv control points will have Nv+kv components. The first and last knot values of each vector are not used for this invention, but are required by PHIGS +. Each span in the surface depends on 2 m successive knot values, where m=ku−1 or kv−1 and ku is the u order of the surface and kv is the v order. These knot values are divided into two groups: one having m knot values preceding the span and the other having m knot values following the span. For example, if ku=4, then there will be 6 knot values for each span: 3 preceding the span and 3 after the span. The knot values will determine if the b-spline is uniform or non-uniform. If the values of the knots are spaced uniformly (for example, 0, 1, 2, 3), then the result is a uniform b-spline. For a non-uniform b-spline, the knot values may be separated by irregular intervals, and knot values may be repeated, as in the knot vector (0.0, 1.2, 1.5, 1.5, 2.7, 9.0).

In this description, the term NURBS is used generically and is meant to encompass the special cases of non-rational (weights set equal to 1) and uniform b-splines.

Figure 2:
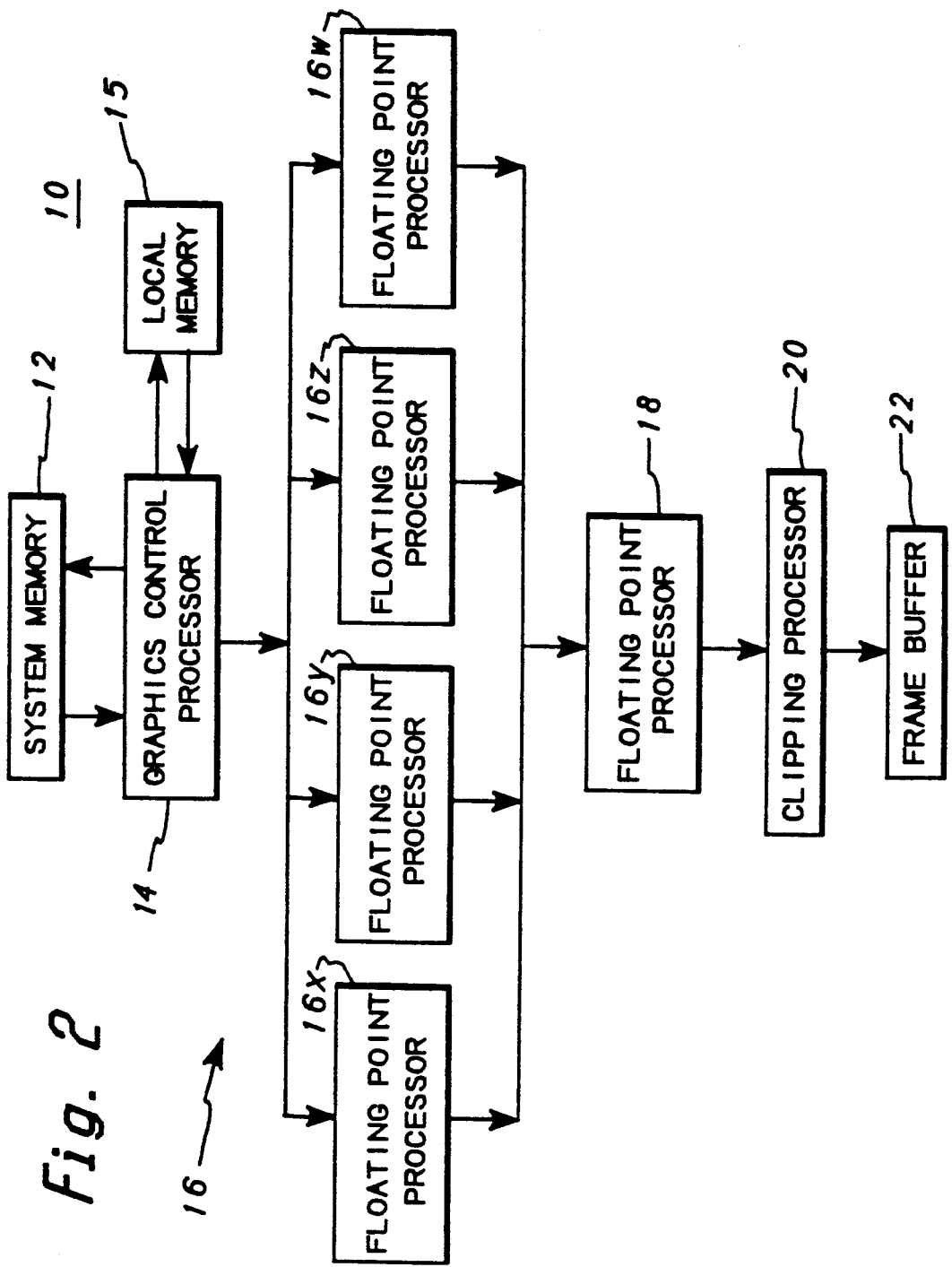
FIG. 2 is a block diagram showing the component parts and interconnection of a surface evaluation and rendering apparatus constructed in accordance with the principles of the present invention.

With this basic understanding of the underlying mathematics, a preferred embodiment of the invention will now be described. A surface evaluation and rendering system (10) constructed in accordance with the principles of the present invention, is represented in FIG. 2, and includes the following principal components:

(1) System Memory (12);
(2) A Graphics Control Processor (14) and associated local memory (15); and, operating in pipeline fashion:
(3) A group (16) of four floating point processors (16x, 16y, 16z and 16w) arranged in parallel;
(4) A further floating point processor (18) connected to the outputs of the parallel floating point processors;
(5) A clipping processor (20); and
(6) A frame buffer (22).

The system memory (12) contains the data for each parametric surface. The data consists of a surface type, which may be rational or non-rational; a surface status flag, which may be 0 for tessellation parameters undefined, or 1 for tessellation parameters defined; the u order (ku) and v order (kv), which are integers in the range of 2 to kmax, where kmax is the maximum order supported by the various processors; the u dimension (Nu) and v dimension (Nv), which are integers in the range of ku . . . Numax and kv . . . Nvmax, where Numax and Nvmax are the maximum values supported by local memory 15 associated with the graphics control processor; u knot values (u(1) . . . u(Nu+ku)); u tessellation parameters (du(1) . . . du(Nu−ku+1)); v knot values (v(1) . . . v(Nv+kv)); v tessellation parameters (dv(1) ... dv(Nv−kv+1)); and a control points matrix consisting of Nv row or data records, where each record contains Nu sets of coordinates (Xi, Yi, Zi, Wi) for i=1 to Nu.

Figure 13:
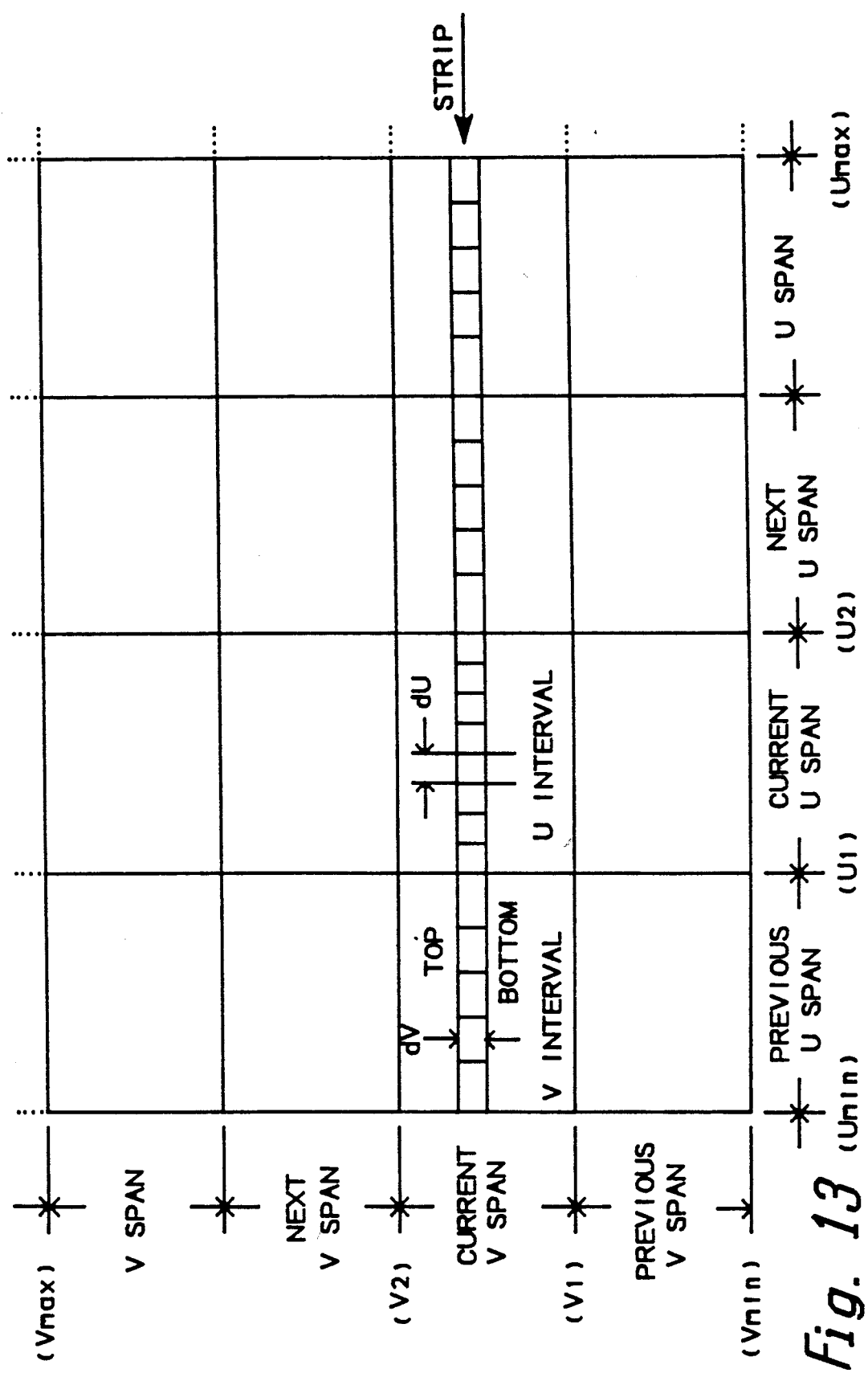
FIG. 13 is an illustration of a parametric surface showing tessellation along the u and v coordinates in accordance with the principles of the present invention.

The use of the foregoing data in the present invention will best be understood by referring to FIG. 13. FIG. 13 is an illustration of a parametric surface having successive u spans along the u coordinate and successive v spans along the v coordinate. The surface is tessellated into strips each having a top edge and a bottom edge. The top and bottom edges are derived from evaluating the v dependence of homogeneous coordinates wx, wy, wz, w for successive v parameter points (separated by a parameter interval (dV). Each strip is tessellated at successive u parameter points (separated by a u parameter interval (dU)) for each successive u span.

The graphics control processor (14) can read the data located in system memory and can write data back to the system memory. It can also write data into and read data out of local memory (15), as indicated by the two-way arrows shown in FIG. 2. The graphics control processor transforms control points data from modelling coordinates to view coordinates, determines whether each patch is visible, determines a parametric coordinate interval (Dv) for tessellating the v parametric coordinate for each v span, generating a series of interval spaced v parameter points (V), converts the transformed control points data to homogeneous coordinates (wx, wy, wz, w), evaluates the v dependence of wx, wy, wz, w yielding a series of Nu bottom coordinates and Nu bottom derivatives and a series of Nu top coordinates and Nu top v derivatives, respectively, for a strip extending fully across the surface along the u coordinate and bounded in the v coordinate by an initial v parameter point and a successive v parameter point, determines a parametric coordinate interval (Du) for tessellating the u parametric coordinates, generating a series of interval spaced u parameter points (PC) for each u span of a strip, and also transmits commands and data to the four parallel floating point processors (16), as more fully explained hereinafter.

Processors 16x, 16y, 16z and 16w independently, simultaneously and synchronously evaluate four b-spline functions including the u dependence of the top and bottom coordinates and the u dependence of the corresponding v derivatives top and bottom coordinates, of a respective one of the homogeneous coordinates wx, wy, wz and w, for each u parametric point PC. The outputs of this evaluation, which include a top and bottom coordinate, a top and bottom u derivative and a top and bottom v derivative for each coordinate, from processors 16x, 16y, 16z and 16w, respectively, for each u parameter point (PC) of a strip are provided in series to floating point processor 18. Processor 18 calculates the reciprocal of w(u,v) and multiplies each of the top and bottom coordinates by this reciprocal to determine the corresponding geometric coordinates and uses the corresponding u and v derivatives to determine the geometric u and v tangents of a strip top point and strip bottom point for each u parametric point PC. It then computes the vertex normals by taking the cross product of the u and v tangents and the magnitudes of the resulting vertex normals. The coordinates and vertex normals for each pair of successive u parameter points PC define a 3-dimensional polygon and are sent by processor 18 to clipping processor 20 where they are processed in known fashion (i.e. the clipping processor will clip the polygon against the current 3-dimensional viewing window, interpolate the vertex normals along clipped edges, and convert the resulting vertex normals to unit vectors). The clipping processor then sends to frame buffer (22) a sequence of 3-dimensional vertex coordinates and normalized vertex normals for any portion of the polygons remaining within the window. The frame buffer 22 then renders the surface upon a monitor screen (not shown) of the computer graphics display, in conventional fashion.

A particular implementation of the present invention will now be described. System memory 12 can comprise 2 to 4 Mbytes (or more) of random access memory (RAM). The system memory must be capable of holding the data for at least one parametric surface and typically contains a display list composed of various graphics elements, i.e. primitives and attributes, including NURBS surfaces. Graphics control processor 14 includes: a floating point multiplier; a floating point adder, also used as an accumulator for the multiplier; a sequencer; ability to access at least 32k code memory; ability to access at least 32k data memory; 32 integer registers; and 32 registers for floating point operation. Processor 14 can be advantageously embodied by a 10 Mhz Weitek chip set (a XL-8136 programmable sequencer, a XL-3132 floating point processor unit, and XL-8137 integer processing unit, working together) available from Weitek of Sunnyvale, Calif.

The Local Memory 15 is a block of random access memory (RAM) which is used as a scratch area by graphics control processor 14. The maximum number of data values to be stored in the local memory is 4 Nmax (kmax+7), where Nmax is the maximum dimension (Nu and Nv), and kmax is the maximum order (ku and kv).

Floating point processors 16x, 16y, 16z, 16w and 18 can each be a VLSI processor with 32-bit floating point capability. Each of these processors includes a floating point multiplier; a floating point adder, also used as an accumulator for the multiplier; a simple sequencer; RAM for microcode; FIFO for input and output for interface; and sixty-four registers for storing data. Floating point processors are known generally in the art. Commonly assigned U.S. patent application Ser. No. 331,021, filed Mar. 28, 1989, now U.S. Pat. No. 4,876,644, discloses an invention which provides special input and output FIFOs for advantageous parallel and/or pipelined interconnection in the manner herein described, and is hereby incorporated herein by reference. Clipping processor 20 and frame buffer 22 may each contain multiple similar processors in any number and configuration which provides adequate performance.

Figure 3:
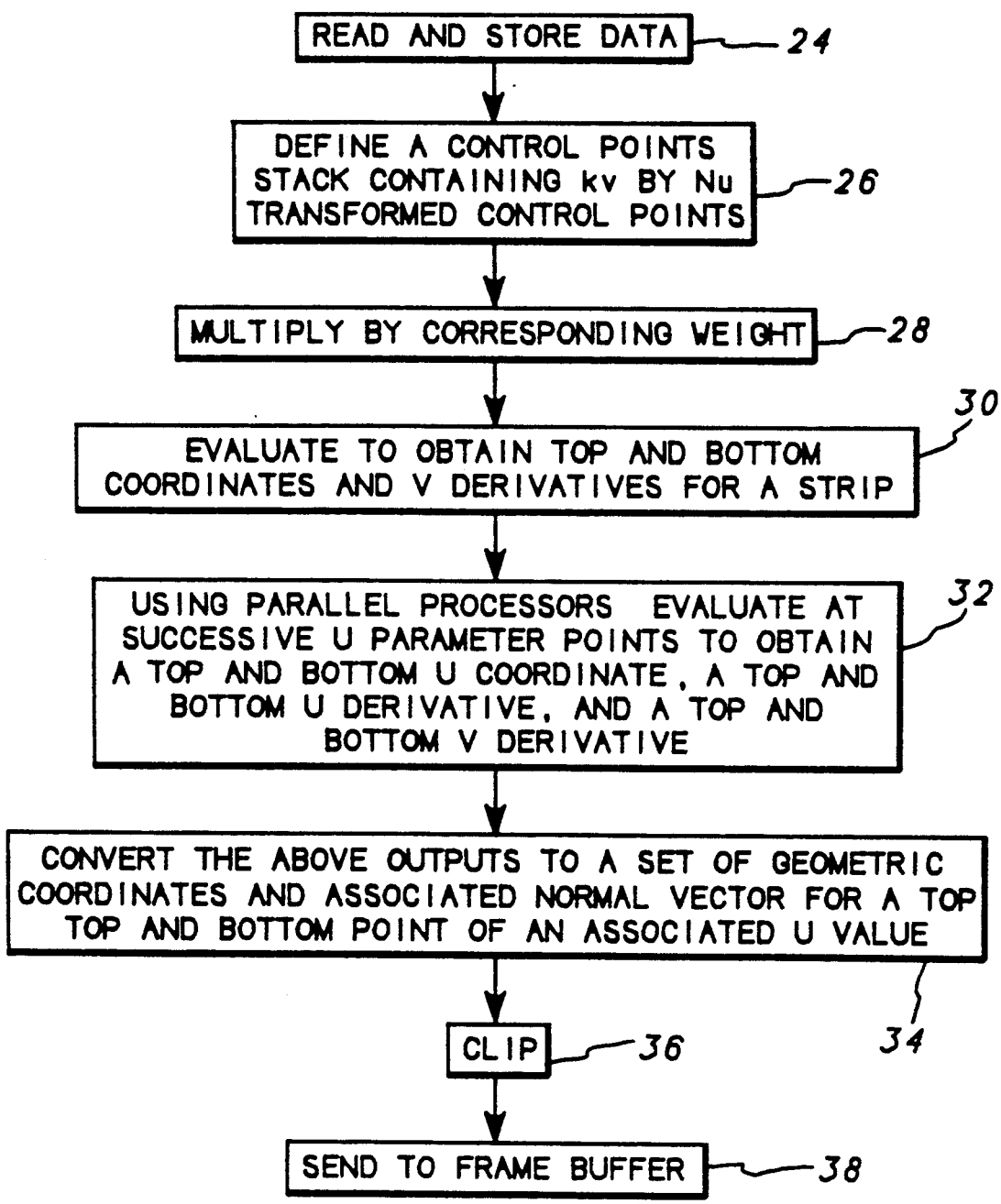
FIG. 3 is a block diagram showing the general operations of a surface evaluation system of the present invention.

Referring to FIG. 3, in general, when a NURBS surface is encountered in the display list of system memory 12, the graphics control processor reads the data and stores it in local memory and/or registers (operation 24). A row of the control points matrix is read from system memory, transformed by the graphics control processor 14 and pushed onto a FIFO (first in-first out) stack (kv rows by Nu columns) in local memory within the graphics control processor (operation 26). This is repeated until enough rows for one v span have been pushed onto the stack. The values for each individual coordinate within each column of the control point stack for a given v span are multiplied by a corresponding weight to produce homogeneous coordinates (wx,wy,wz,w) (operation 28) which are then evaluated based on a current v parametric points. When this evaluation is complete for the coordinates of each control point within each column of the v span, a series of top coordinates and top v derivatives is yielded. These are associated with the top of a current strip. The top values of the previous strip will be copied and used as the values of bottom coordinates and derivatives for the current strip (operation 30).

For each u span of the current strip, a set of u knots and sets of top and bottom coordinates and derivatives for each coordinate (wx, wy, wz, or w) are sent to a respective one of four parallel processors (16). Within each processor four b-splines (top coordinate, top v derivative, bottom coordinate, bottom v derivative) will be evaluated for successive u parametric points (PC) resulting in a value for the top and bottom coordinates, top and bottom u derivatives and top and bottom v derivatives for each u parametric point within the strip (operation 32). The results after each evaluation for each u parametric point PC are sent to processor 18, which eliminates the weight from each coordinate, determines the vertex geometric coordinates, vertex u and v tangents and, therefrom, the vertex normals for a pair of strip top and bottom points corresponding to each u parametric point PC of the strip. The vertices for every two successive u parameter points define a polygon (operation 34). The vertex information from processor 18 is sent to the clipping processor (20). The clipping processor then clips the polygon in the conventional method (operation 36) and sends the results to the frame buffer (22) (operation 38).

The initial u span of the surface is defined by the first ku columns of control point data in the FIFO stack. Subsequent u spans are defined by each successive column in conjunction with the ku-1 immediately preceding columns.

After each u span of the current strip is evaluated, then the top coordinates and derivatives are copied to the bottom coordinates and derivatives of the next strip, the parametric point, V is updated and the flow returns to evaluate a new strip. This is repeated for all values of V for the current v span and then for succeeding v spans. Each succeeding v span is defined by loading a succeeding row of the control point matrix into the top of the FIFO control point stack. The particular processing of the NURBS data as described above, affords the numerous benefits of the present invention.

The particular operations of the graphics control processor, as well as the operations of the other processors in the surface evaluation system (10) are shown in the flowcharts in FIGS. 4, 5, and 6 and will now be explained in detail.

Figure 4:
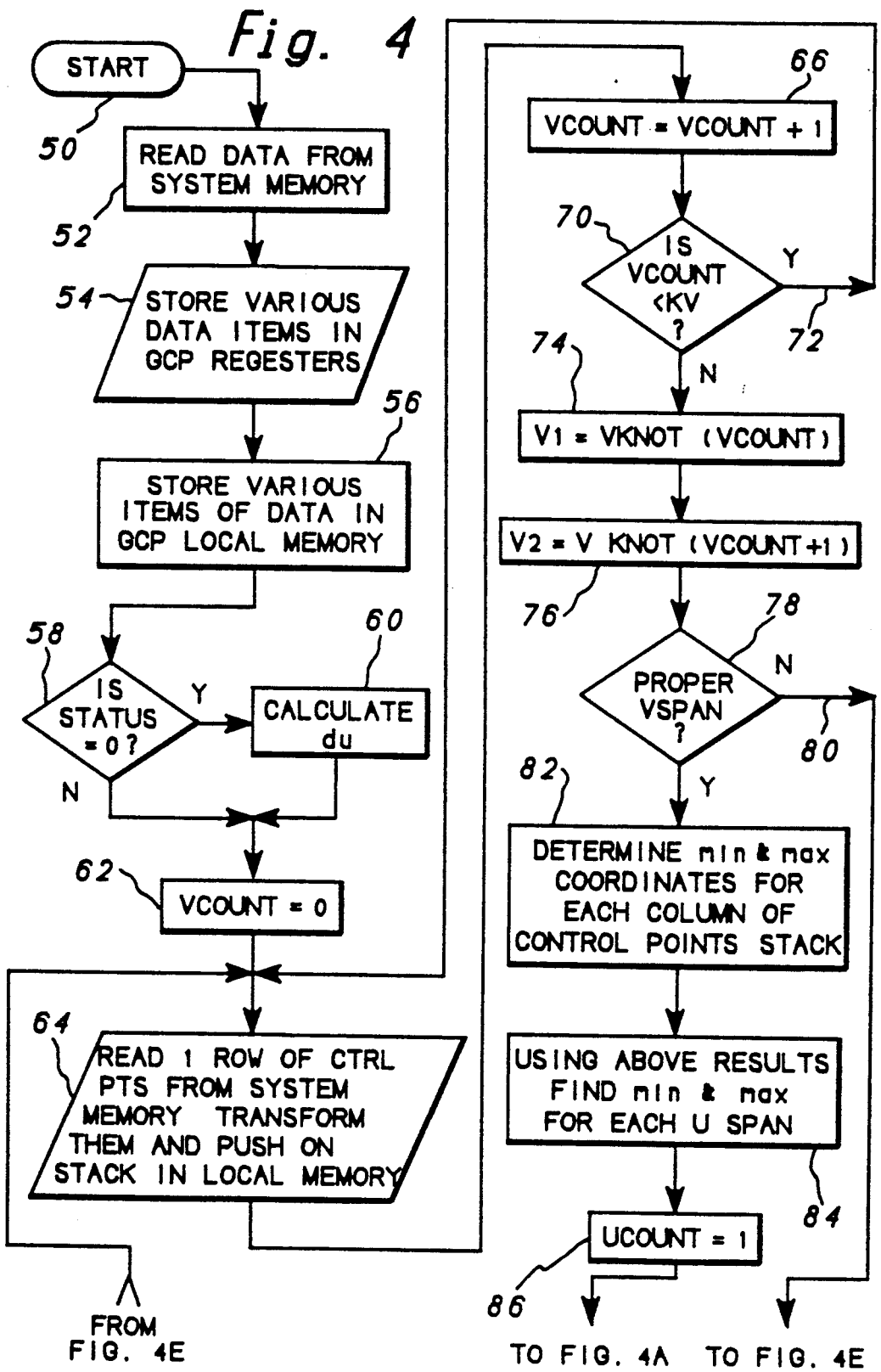
FIGS. 4–4F present a flowchart of the operations of a surface evaluation system in accordance with the principles of the present invention.

Referring to FIG. 4, the surface data, which was previously described, is read from system memory (operation 52), and is stored in either registers and/or local memory 15 of the graphics control processor 14. The surface type and status flag are stored in registers. The u parameter order (ku), u dimension (Nu), Umin, Umax, v parameter order (kv), v dimension (Nv), Vmin and Vmax are all stored in registers and local memory within the graphics control processor (operation 54). The u knot values, u tessellation parameters, v knot values, v tessellation parameters and control point matrix are stored within local memory of the graphics control processor (operation 56). Within local memory, the u tessellation parameters and u knot values are stored as one vector. This vector is large enough to hold 2 rows with N2 words each, where N2 is equivalent to the maximum u dimension supported by local memory (e.g. 64). The first row contains all of the u tessellation parameters and up to and including ku knot values. Listed below is an illustration of the u tessellation and u knot vector where row indicates the row within the vector and position represents the location within a specific row:

| Row | Position | Value | Description |
|---|---|---|---|
| 1 | 1 | dU(1) | first u tessellation parameter |
| 1 | 2 | dU(2) | second u tessellation parameter |
| 1 | ... | ... | ... |
| 1 | Nu−ku+1 | dU(Nu−ku+1) | last u tessellation parameter |
| 1 | ... | ... | ... |
| 1 | N2−ku+1 | u(1) | first u knot (not used) |
| 1 | N2−ku+2 | u(2) | second u knot |
| 1 | ... | ... | ... |
| 1 | N2 | u(ku) | u knot number ku |
| 2 | 1 | u(ku+1) | u knot number ku+1 |
| 2 | ... | ... | ... |
| 2 | Nu | u(ku+Nu) | last u knot |

The above also hold true for the v tessellation parameters and v knot values. Listed below is an illustration of the v tessellation and v knot vector:

| Row | Position | Value | Description |
|---|---|---|---|
| 1 | 1 | dV(1) | first v tessellation parameter |
| 1 | 2 | dV(2) | second v tessellation parameter |
| 1 | ... | ... | ... |
| 1 | Nv−kv+1 | dV(Nv−kv+1) | last v tessellation parameter |
| 1 | ... | ... | ... |
| 1 | N2−kv+1 | v(1) | first v knot (not used) |
| 1 | N2−kv+2 | v(2) | second v knot |
| 1 | ... | ... | ... |
| 1 | N2 | v(kv) | v knot number kv |
| 2 | 1 | v(kv+1) | v knot number kv+1 |
| 2 | ... | ... | ... |
| 2 | Nv | v(kv+Nv) | last v knot |

The next step in FIG. 4 is to examine the status flag within the graphics control processor (operation 58). The status flag is used to identify whether or not the u vessellation parameters for each u span of the control point matrix have been calculated. If the status flag is equal to 0, then these dU values need to be calculated (operation 60). The steps necessary to calculate the tessellation parameters, for each u span of the control point matrix will best be understood by referring to the flowchart in FIG. 5. This flowchart is an expansion of the box labelled 60 (calculate dU) in FIG. 4.

Tessellation is the process by which a curved surface is divided into areas which may be approximated with flat polygons.

Figure 7A:
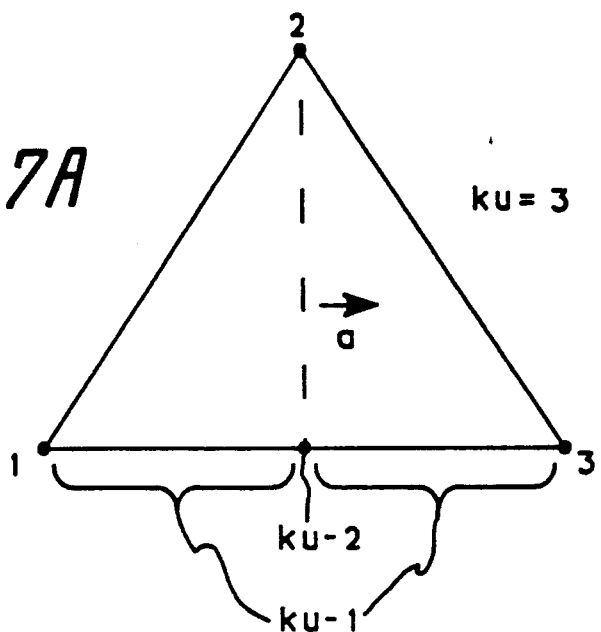
FIGS. 7A and 7B are illustrations useful in understanding how to calculate the tessellation parameter used in the present invention.
Figure 7B:
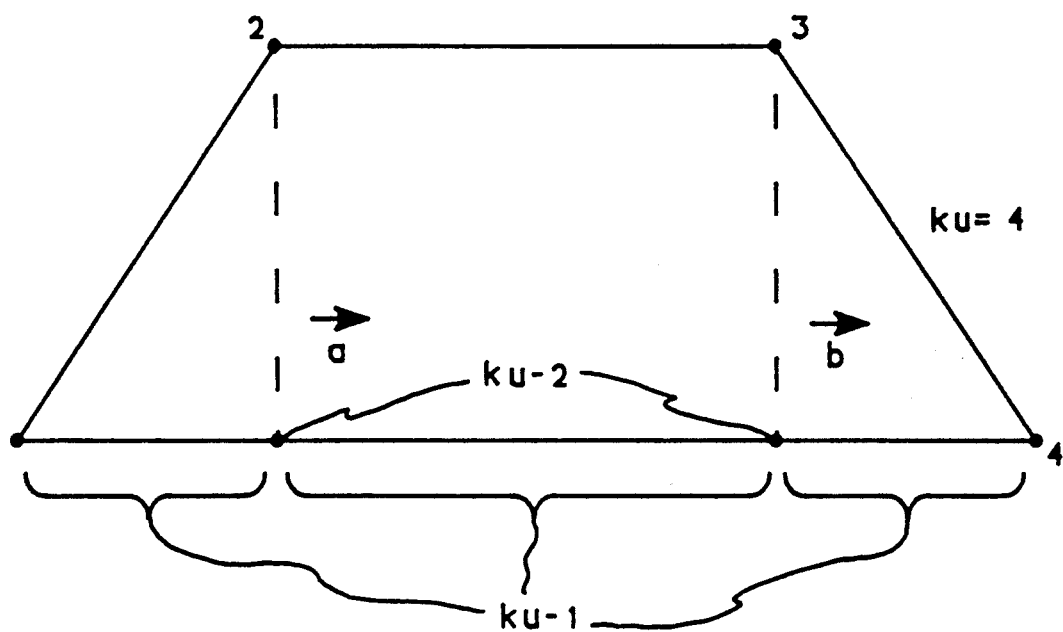

The calculation of the u tessellation parameter is dependent on the number of control points in a u span, which is defined by the u order (ku) of the surface. As illustrated in FIGS. 7A and 7B, a surface of u order (ku), has ku control points per u span and ku-1 sections for each row of Nv control points. The ku control points consist of 2 end points and ku-2 intermediate points. Therefore, if ku=3, there would be 2 sections and 1 intermediate point yielding $dU = |ax| + |ay| + |az|$ where: dU is a bound on the length of vector a and a is the bound on the chordal deviation of the corresponding u span. If ku=4, there would be 3 sections and 2 intermediate points yielding $$dU = |ax| + |bx| +$$
$$|ay| + |by| +$$
$$|az| + |bz|$$

where dU is a bound on the sum of the lengths of vectors a and b.

Figure 5:
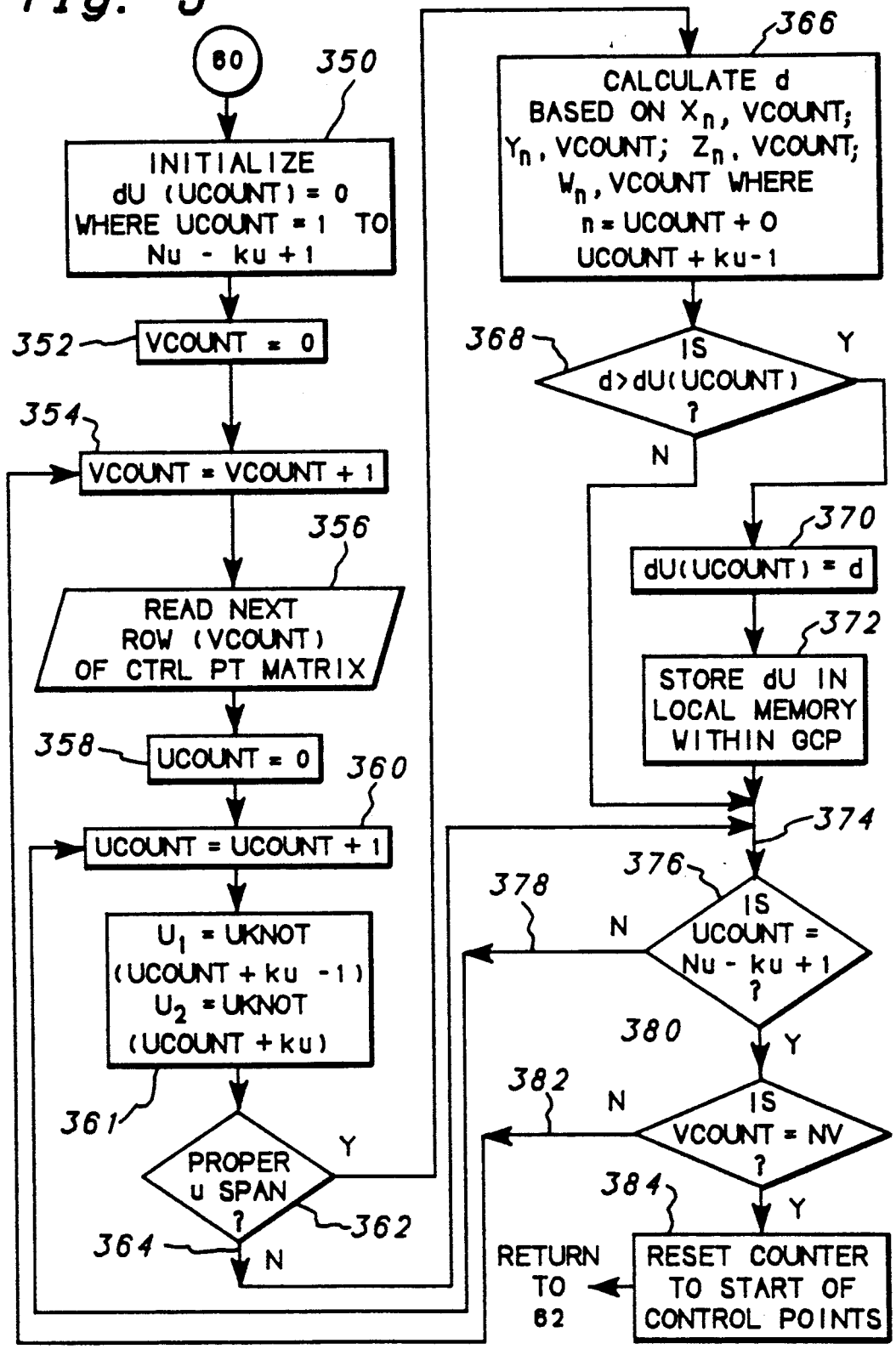
FIG. 5 presents a flowchart of the operations used in order to calculate the u tessellation parameters.

Referring to FIG. 5, initially all the u tessellation parameters (dU) for each u span must be initialized to 0 (operation 350). This is accomplished by setting dU (ucount)=0 where ucount=1 to Nu−ku+1, which is the number of u spans. Next, a register called vcount, which represents the current row of data in the control point matrix being used for the specific dU calculation, is set equal to 0 (operation 352), and immediately thereafter is updated by 1 (operation 354). Then, a row (vcount) is read from the control point matrix (operation 356). Next, a register called ucount is set equal to 0 (operation 358), and immediately thereafter is updated by 1 (operation 360). In this instance, ucount represents the particular column of data in the control point matrix being used in the specific dU calculation. Next, $U_1$, which represents the beginning of the u span, is set equal to uknot (ucount+ku−1) and $U_2$, which represents the end of the u span, is set equal to uknot (ucount+ku) (operation 361).

After these initial steps are complete, the next step is to determine if there is a valid u span (operation 62). A u span is valid if $U_1 < U_{max}$ $U_2 > U_{min}$ and $U_2 > U_1$ where $U_1$ and $U_2$ are equal to the values given in the previous step and the values of Umax and Umin have been previously read from system memory and stored in registers and local memory within the graphics control processor.

If the u span is invalid, then the flow will pass to 376 (Is ucount=Nu−ku+1?) via line 364 in order to skip to the next u span. If the u span is valid, then the calculation of the maximum u tessellation parameters (dU) will continue (operation 366).

At this point, the dU tessellation parameter, temporarily referred to as d, will be calculated based on X(n, vcount), Y(n, vcount), Z(n, vcount), W(n, vcount), where n goes from ucount to ucount+ku−1 for each value of vcount (operation 366). For example, if ku=3, vcount=1, and ucount=1, then d will be calculated based on the values of the control points represented by: $x_{11}, y_{11}, z_{11}, w_{11}; x_{21}, y_{21}, z_{21}, w_{21}; x_{31}, y_{31}, z_{31}, w_{31}$. The resulting value of d will then be compared to dU (ucount) (operation 368). If d is greater than the value represented by dU (ucount), then dU (ucount) will be set equal to d (operation 370), and stored in local memory within the graphics control processor (operation 372).

Next, it will be determined if ucount is equal to Nu−ku+1 (operation 376), which is the number of u spans. If it is not equal, then the flow returns to 360 (update ucount) via line 378. If it is equal, then the maximum u tessellation parameters for each u span of a given row have been determined. Next, vcount will be compared to Nv, which corresponds to the number of rows in the control point matrix (operation 380). If vcount is not equal to Nv, then the flow will return to 354 (increment vcount) via line 382, and the above tessellation process will be repeated for the u spans of a new row. If vcount is equal to Nv, the vector of u tessellation parameters will contain the maximum dU values for each u span of the control point matrix. Next, the pointer for the control point matrix will be reset and flow will return to 62 (initialize vcount) in FIG. 4.

Referring again to FIG. 4, vcount will be initialized to 0 (operation 62) and then, one row of control points will be read from system memory 12 by graphics control processor (I4). These control points will then be transformed from modelling coordinates to view coordinates (x, y, z) by processor 14 (operation 64). Transformation is the process by which x,y,z coordinates are translated, rotated and scaled as desired, in the conventional manner. The transformation matrix used for this process was previously loaded in the graphics control processor.

Figures 8A, 8B:
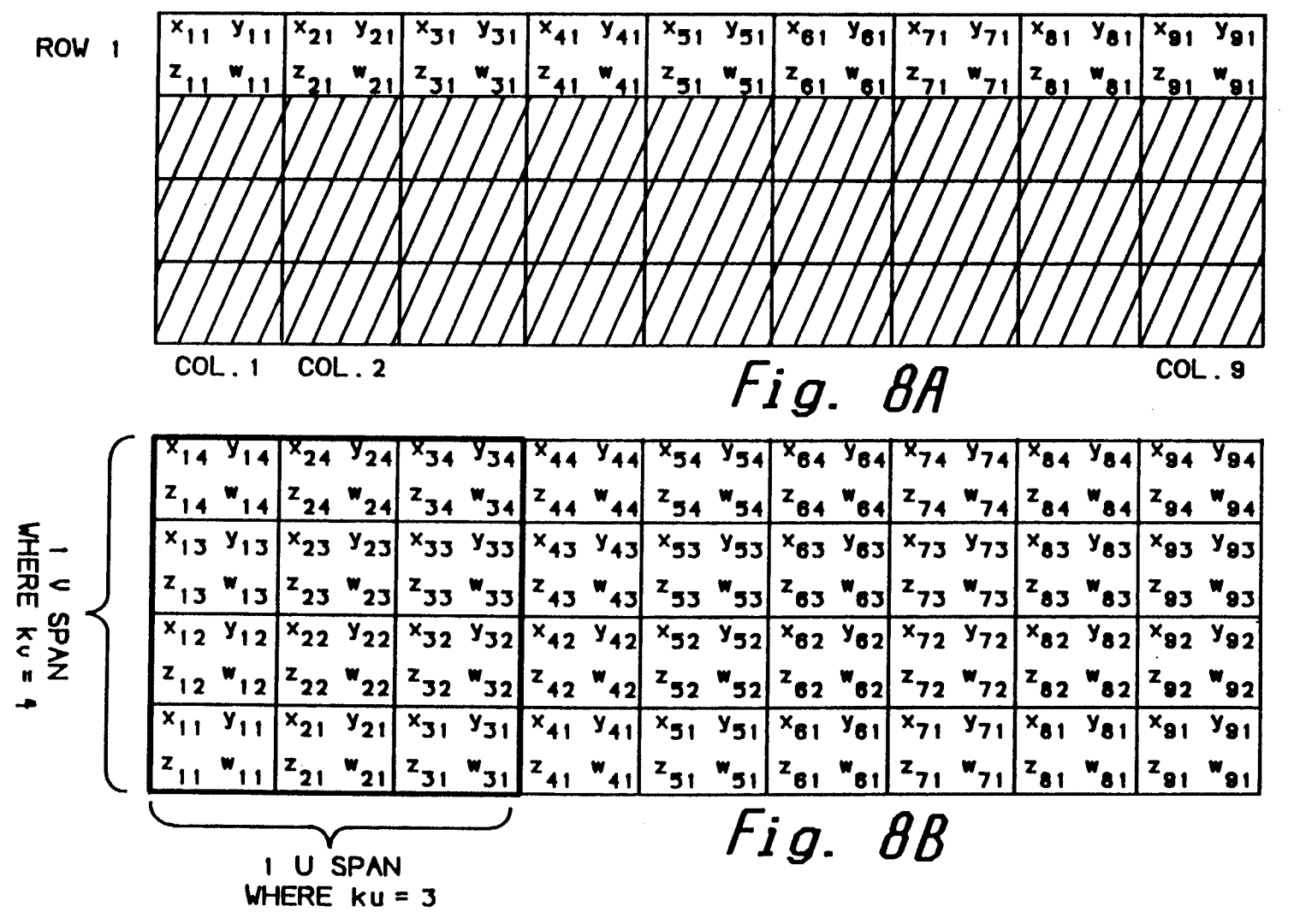

After the transformation process is complete, the transformed coordinates are pushed onto a stack in local memory. This stack is large enough to hold Nu columns of data and kv rows, and operates in a first in-first out (FIFO) manner. For an illustration of this stack after one row of control points has been pushed on see FIG. 8a. Next, the graphics control processor will determine if vcount is less than the order (kv) (operation 70). If vcount is less than kv, then the flow will return to 64 (Read 1 row of control points) via line 72. If vcount is equal to or greater than kv, this signifies that enough rows of data for a v span have been pushed onto the control point stack. Then, $V_1$, which is the beginning of the v span, will be set equal to vknot (vcount) (operation 74) and $V_2$, which is the end of the v span, will be set equal to vknot (vcount+1) (operation 76).

Next, it will be determined if this v span is valid (operation 78). A v span is valid if:

$V_1 < V_{max}$ $V_2 > V_{min}$ and $V_2 > V$ where $V_1$ and $V_2$ are equal to the values given in the previous step and the values of Vmax and Vmin have been previously read from system memory and stored in registers and local memory within the graphics control processor.

If the v span is invalid, the flow will pass to 280 (Is vcount<Nv) via line 80, in order to continue to the next v span. If the v span is valid, then the minimum and maximum coordinates for each patch will be determined. A patch is determined by ku columns and kv rows. Therefore, if, for example, ku=3 and kv=4, a patch will be determined by 12 locations or "boxes" within the control point stack. For an illustration of such a patch see FIG. 7B. In order to calculate the minimum and maximum coordinates for a patch, the minimum and maximum coordinates for each column of the control point stack will have to be determined first (operation 82). The resulting values will be placed in a row set aside in storage corresponding to either: (xmin(i), ymin(i), zmin(i), and vsbl(i)), or (xmax(i), ymax(i), zmax(i) and Qmin(i) where i is the current column.

In order to determine the minimum and maximum coordinates for each column of the control point stack, each value of x, y, or z of one column will be compared with the remaining values of x, y, or z within the same column. For example, if a control point stack had two columns and four rows such as:

|       | COLUMN 1 | COLUMN 2 |
|-------|----------|----------|
| Row 4 | $x_{14}, y_{14}, z_{14}, w_{14}$ | $x_{24}, y_{24}, z_{24}, w_{24}$ |
| Row 3 | $x_{13}, y_{13}, z_{13}, w_{13}$ | $x_{23}, y_{23}, z_{23}, w_{23}$ |
| Row 2 | $x_{12}, y_{12}, z_{12}, w_{12}$ | $x_{22}, y_{22}, z_{22}, w_{22}$ |
| Row 1 | $x_{11}, y_{11}, z_{11}, w_{11}$ | $x_{21}, y_{21}, z_{21}, w_{21}$ |

Then, to determine the minimum and maximum x value within the first column, all the x values within that column ($x_{11}$, $x_{12}$, $x_{13}$, $x_{14}$) will be compared to each other. The resulting minimum value will be stored in xmin(i) and the resulting maximum value will be stored in xmax(i). This same procedure is used to determine the minimum and maximum values of y and z, and the results are placed in ymin(i), ymax(i), zmin(i) and zmax(i), respectively. However, there is no need to calculate the minimum and maximum values of the w coordinate. Therefore, the space in storage that would correspond to wmin(i) and wmax(i) has been reserved for vsbl(i) and Qmin(i), respectively. At this point each value of register vsbl(i) will be initialized to 0 and each value of register Qmin(i) will be initialized to 0.0. These registers will be further explained hereinafter.

The results from the above determinations of the minimum and maximum values for each coordinate within a column will now be used to find the minimum and maximum value for each u span (operation 84). For example, if the calculations of the minimum values of the x coordinates for each column, where the number of columns (Nu) equals 9, yielded a row of results such as: xmin1 xmin2 xmin3 xmin4 xmin5 xmin6 xmin7 xmin8 xmin9 then, the minimum value for a u span is calculated as follows:

where $i = s$ to $s + ku - 1$, where $s = 1$ to $Nu - ku + 1$.

$Nu - ku + 1$ is the number of u spans, and ku is the u order of the surface. Therefore, where $Nu = 9$, and $ku = 3$, the number of u spans will equal 7, and the first xmin value will be determined by comparing xmin1, xmin2 and xmin3 (note at this point in the example $s = 1$, thus $s + ku - 1 = 3$) and i goes from 1 to 3, which refers to the first to third columns in the row). The resulting value from this comparison will be stored in xmin(s) replacing the value already in that location within local memory. The same procedure is followed to find the maximum values, but the results will be placed in xmax(s). When this process is complete for all coordinates (x, y, z) and all u spans, the results will be the minimum and maximum coordinates for each patch within the current v span.

Next, ucount will be initialized to 1 (operation 86). Then, a comparison will be made between the minimum and maximum values just determined for each patch to the window boundaries (operation 88). If they overlap (operation 90), then, the register previously mentioned called vsbl (ucount) and a bit in a status register called vis will be initialized to 1 (operations 92 and 94). Then the normal threshold Qmin (ucount) will be calculated (operation 96). The storage necessary for the Qmin values was set aside earlier.

$$Qmin(s) = (e \cdot ((xmax(s) - xmin(s))^2 + (ymax(s) - ymin(s))^2 + (zmax(s) - zmin(s))^2))^2$$

where s is representative of 1 to $Nu - ku + 1$ (number of u spans), and e is a small number such as $10^{-5} = 0.00001$, which is representative of the accuracy of the floating point number used in the computations of coordinates and normal vectors.

Next, ucount is compared to the number of u spans, $Nu - ku + 1$ (operation 98). If they are unequal, then ucount is incremented by 1 (operation 100) and the flow returns to 88 (compare min and max for u span (ucount)) via line 102. If they are equal, then vis is compared to 0 (operation 104). If vis = 0, then a whole row of patches is not visible so the flow will pass to 280 (Is vcount < Nv) via line 105. If vis is not equal to 0, then one or more patches are visible so the flow continues.

Next, the status flag is compared to 0 (operation 106). The status flag will identify whether or not the v tessellation parameter has been calculated. If the status flag is not equal to 0, then the v tessellation parameter has been defined and the flow will skip to 112 (calculate Dv). If status = 0, then the tessellation parameter, dV will be calculated and stored in local memory within the graphics control processor (operation 110).

Figure 6:
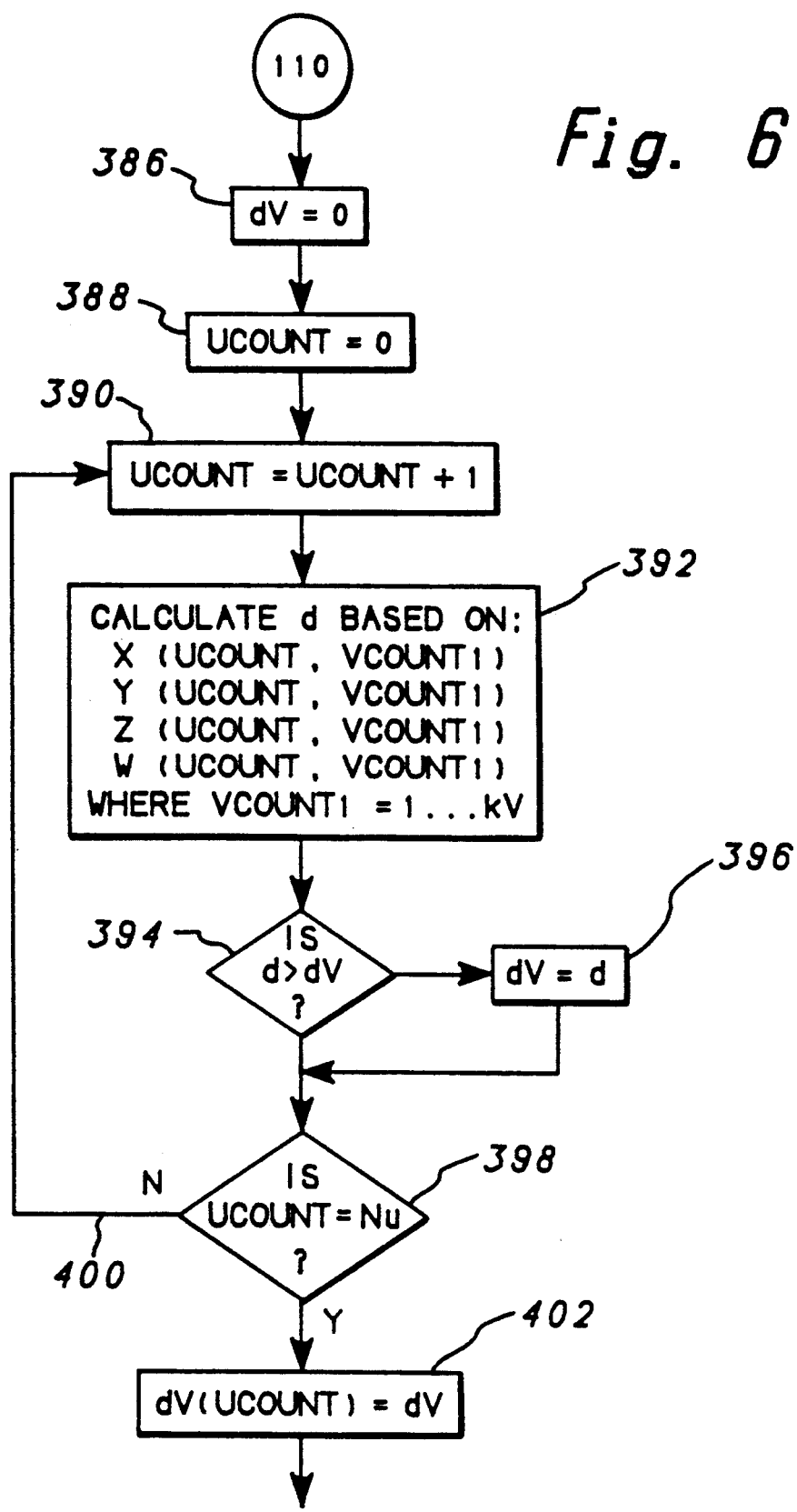
FIG. 6 presents a flowchart of the operations used in order to calculate the v tessellation parameters.

Once again, the steps necessary to calculate the v tessellation parameter, dV, will best be understood by referring to the flowchart in FIG. 6. This flowchart will be an expansion of the box labelled 110 (calculate dV) in FIG. 4A.

Referring to FIG. 6, generally, the flowchart is an illustration of the steps necessary to calculate the maximum v tessellation parameter for an entire v span. In order to calculate this maximum dV value, the following steps will be performed. First, dV and ucount will be initialized to 0 (operations 386, 388), and then immediately thereafter ucount will be incremented by one (operation 390).

Next, the v tessellation parameter will be calculated (operations 392) based on:

x (ucount, vcount1)

y (ucount, vcount1)

z (ucount, vcount1)

w (ucount, vcount1)

where vcount1 = 1 to kv, which is the v order of the surface. The result of this calculation will be stored in a register called d. Then, d will be compared to the value stored in register dV (operation 394). If d is greater than dV, then dV will be set equal to d (operation 396). If d is less than or equal to dV, then ucount is examined to see if it is equal to Nu, which is the number of columns in the control points matrix (operation 398). If they are not equal, then the flow will return to 390 (increment ucount by 1) via line 400. If ucount equals Nu, then dV (ucount) is set equal to dV (operation 402). At this point, dV (ucount) contains the maximum v tessellation parameter for the entire V span. Next, the flow will return to 112 (calculate Dv) in FIG. 4A.

Referring to FIG. 4A, the next step is to calculate Dv, which is the v parametric coordinate interval. Dv is calculated by the graphics control processor (operation 112) as follows:

$$Dv = (v_2 - V_1)/Nvstep$$

where Nvstep is determined by:
(a) calculating the scale, s, which equals the ratio of screen (pixel) coordinates/data coordinates;
(b) converting dv (vcount-kv+1) into pixel units, which are device coordinates by multiplying dv (vcount-kv+1) by s yielding dv'; and
(c) calculating Nvstep where Nvstep=max (1, Int sqrt(dv'))

After the v parametric coordinate interval is calculated, $V_1$ and $V_2$ will be adjusted in order to ensure the beginning and ending of a v span are not outside the boundaries set by Vmin and Vmax (operation 114), as follows. If Vmin is between $V_1$ and $V_2$, then V will be set equal to Vmin, and if Vmax is between $V_1$ and $V_2$, then $V_2$ will be set equal to Vmax.

Next, registers referred to as vflag, which represents the start of the first v span and vlast, which represents when to exit the v interval loop, will be initialized to 0 (operations 116 and 118). Then, the current v parameter point, V, will be set equal to $V_1$, which is the beginning of a v span, (operation 120) and ucount will be initialized to 0 (operation 122). Next, ucount will be incremented by 1 (operation 124).

After the initializations are complete, the graphics control processor will evaluate the V dependence of the homogeneous coordinates (wx, wy, wz, w) for the current value of the v parameter point, V. In order to obtain the homogeneous coordinates each value of x, y, z will be multiplied by the corresponding value of w. Therefore, x (ucount, vcount), y (ucount, vcount), z (ucount, vcount) will be multiplied by w (ucount, vcount).

In a preferred embodiment, a process known in the art as the Cox-DeBoor (or DeCasteljau) process is employed for evaluation. This process performs a linear interpolation between the components of the control points. A total of kv (kv−1)/2 interpolations will be performed for each value of V.

Figure 9A:
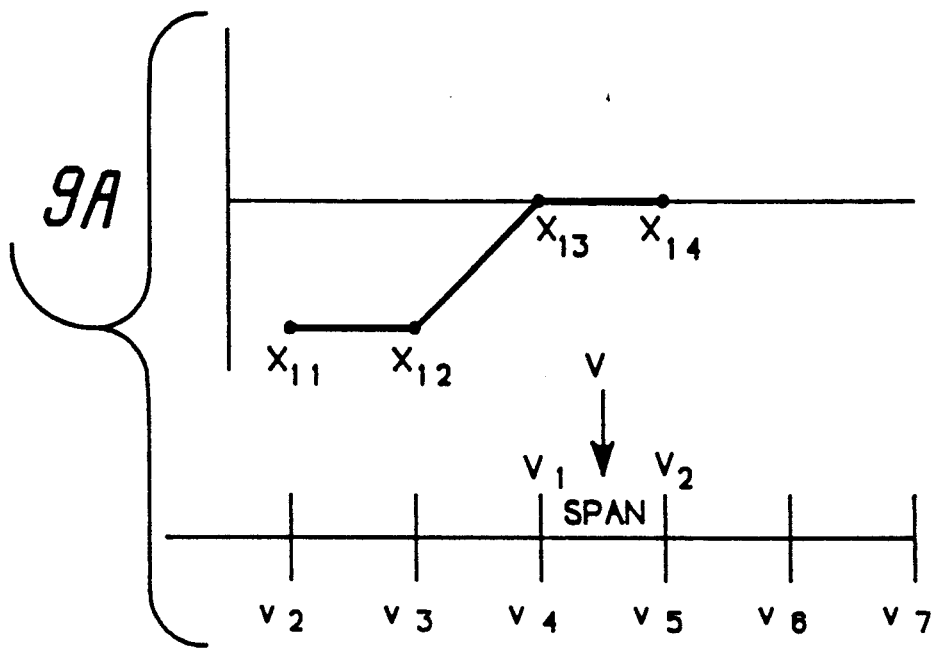
FIGS. 9A–9F depict the application of the Cox-DeBoor evaluation method preferably used in the present invention.

In order to illustrate this algorithm, an example will be given for a surface where kv=4. FIG. 9A depicts the x coordinates for kv control points, where kv=4; a span beginning at knot value $V_1$ and ending at knot value $V_2$, where $V_1$ and $V_2$ are equal to the values in the vknot and tessellation vector located at vknot (vcount) and vknot (vcount+1) respectively; a parameter point, V; three knot values before the span ($v_2$, $v_3$, $v_4$) and three knot values after the span ($v_5$, $v_6$, $v_7$). The six knot values $v_2$-$v_7$, represent the knot values within the knot vector at vcount−kv+2, vcount−kv+3, vcount, vcount+1, vcount+2, vcount+kv−1, respectively.

Figure 9B:
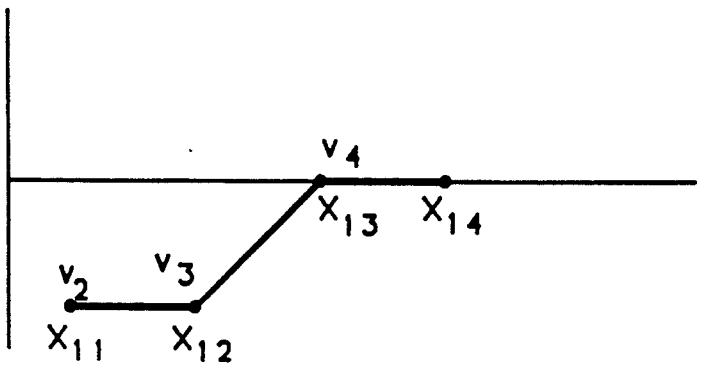
Figure 9C:
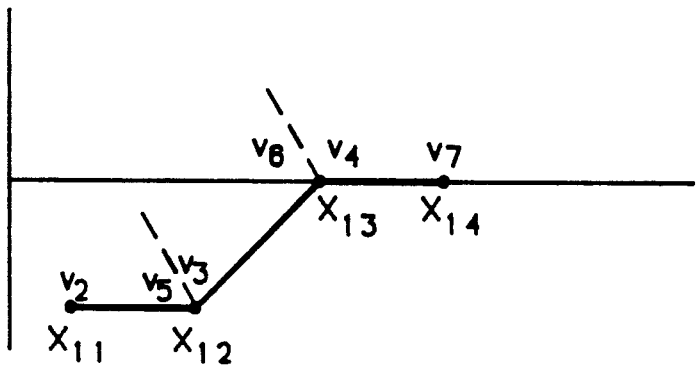

FIG. 9B is an illustration of the positioning of the before knots ($v_2$, $v_3$, $v_4$), which represent the beginning of each piece to be interpolated, and FIG. 9C is an illustration of the positioning of the after knots ($v_5$, $v_6$, $v_7$) which represent the end of each piece to be interpolated. Therefore, an interpolation will be performed between $v_2$ and $v_4$, $v_3$ and $v_6$, and $v_4$ and $v_7$.

The Cox-Deboor algorithm uses the above-mentioned variables in the following equations. The example below is for a surface with a v order kv=4:

$$f_1 = ((v_5 - V)x_{11} + (V - v_2)x_{12})/(v_5 - v_2)$$

$$f_2 = ((v_6 - V)x_{12} + (V - v_3)x_{13})/(v_6 - v_3)$$

$$f_3 = ((v_7 - V)x_{13} + (V - v_4)x_{14})/(v_7 - v_4)$$

Figure 9D:
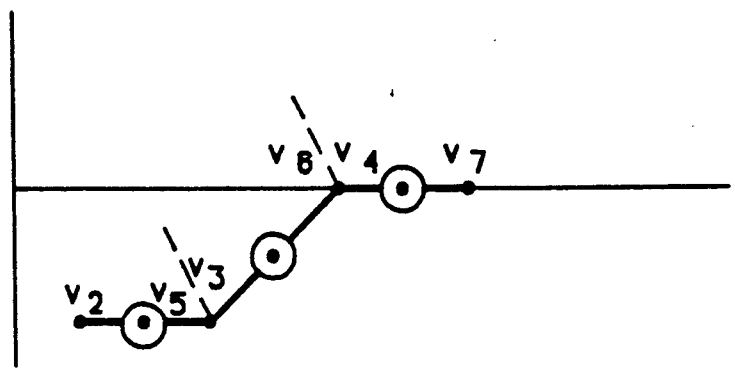

The above 3 equations are used in the first stage of linear interpolations for a surface where kv=4. An interpolation is performed between $v_2$ and $v_5$, $v_3$ and $v_6$, and $v_4$ and $v_7$ in order to yield 3 points. These 3 points are illustrated in FIG. 9D by a circle with a point inside the circle.

The second stage of interpolation requires a repositioning of the knot values. At this stage, we only have 3 points, therefore we only require knots $v_3$ through $v_6$. Knots $v_3$ and $v_4$ are the new before knots and $v_5$ and $v_6$ are the new after knots. The following two equations are used during this second stage of linear interpolations for a surface where kv=4:

$$f_1 = ((v_5 - V)f_1 + (V - v_3)f_2)/(v_5 - v_3)$$

$$f_2 = ((v_6 - V)f_2 + (V - v_4)f_3)/(v_6 - v_4)$$

Figure 9E:
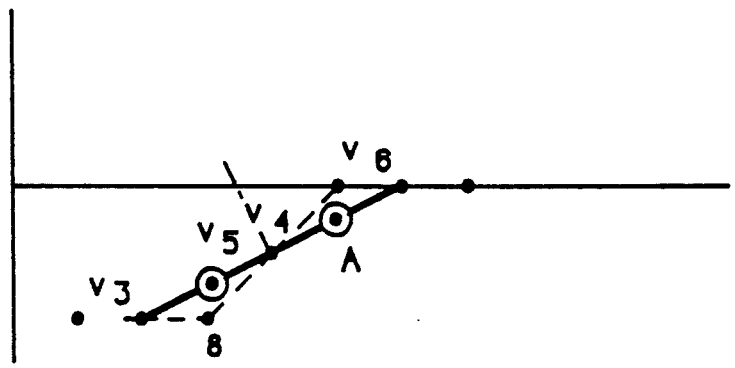

An interpolation is performed between $v_3$ and $v_5$, and $v_4$ and $v_6$ to yield 2 points. These 2 points are illustrated in FIG. 9E by a circle with a point inside the circle.

This interpolation also yields a tangent, which will be used to compute the derivatives. In order to obtain the tangent, subtract the value at A from the value at B. A and B are illustrated in FIG. 9E.

The last stage of interpolation again requires a repositioning of the knot values. At this stage we have only 2 points, therefore we only require knots $v_4$ and $v_5$. The following equation is used to yield the x coordinate of a point on the surface.

$$f(V) = ((v_5 - V)f_1 + (V - v_4)f_2 - (v_5 - v_4))$$

Figure 9F:
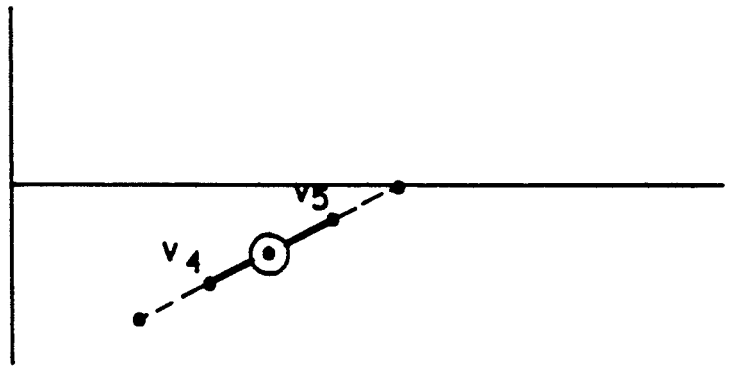

This point is illustrated in FIG. 9f by a circle with a point inside the circle. The above algorithm including the calculation of the tangent is performed on each coordinate (wx,wy,wz,w) within the graphics control processor to yield wx, wxv, wy, wyv, wz, wzv, w, wv (v indicating a v derivative) (operation 128).

After the evaluation of wx,wy,wz,w, the resulting points and derivatives are saved in a v interval stack as top coordinates TC (operation 130), and top v derivatives TVD (operation 132), respectively. The v interval stack has 2 rows and a width up to 8×N2, where N2 is the maximum u dimension (e.g. 64) supported by local memory within the graphics control processor. The top row of the stack has top coordinates and top derivatives, and the next row has bottom coordinates BC and bottom derivatives BVD. For an illustration of a v interval stack see FIG. 10A.

After the evaluation is complete for wx,wy,wz,w of a column, ucount is compared to the u dimension Nu (operation 134). If ucount does not equal Nu, then the flow will return to 124 (increment ucount) via line 135, in order to continue the evaluation process until all the components within each column of the control point stack have been evaluated. When all the components within each column have been evaluated, ucount will be equal to Nu and the top edge of a strip will have been defined. See FIG. 13 for an illustration of a strip with a top and bottom edge.

Next, vflag is compared to 0 (operation 136). If vflag is equal to 0, it is the start of the first vspan, thus the flow will skip down to 258 (vflag=1) via line 138. This skip is necessary since the following steps to be performed will require not only the top coordinates and v derivatives, which have been derived, but bottom coordinates and v derivatives which have not been derived at this time. If vflag is not equal to zero, then top and bottom coordinates and v derivatives have been calculated, and the process may continue. At this time, a strip has been defined. See FIG. 13.

Next, the command "Start Parametric Surface" and the order (ku) are sent to each parallel floating point processor (16) (operations 140, 142). Then, ku-1 u knots are read from local memory within the graphics control processor and sent to each parallel floating point processor (operation 144). Within each processor these u knots are pushed onto a stack. Each stack is large enough to hold 2ku−2 rows of data and each operates in a first in-first out (FIFO) manner. For an illustration of the knot stack within each parallel processor see FIG. 11. Each stack in the figure contains the ku−1 u knots just pushed on.

Next, ucount is initialized to 0 (operation 146) and a command "Start Surface Span" is sent to each parallel floating point processor (operation 148). Then, ucount is incremented by 1 (operation 150), and the u order (ku) and uknot (ku+ucount−1) are sent to each parallel floating point processors (16) (operation 152). After each parallel floating point processor (16) receives the u knot value, the value is pushed onto the stack within each processor as described above (operation 154).

Next, for each coordinate (x,y,z,w), the corresponding top coordinate, top v derivative, bottom coordinate, bottom v derivative within column (ucount) of the v interval stack are sent from graphics control processor to the appropriate floating point processor. For example, the information corresponding to the x coordinate will go to processor 16x, the information corresponding to the y coordinate will go to processor 16y, and so forth. After the data is received by the appropriate processor, that processor will push the data onto a stack. This data stack is 4 columns wide and ku rows deep and also operates in a FIFO manner. For an illustration of each stack within each processor after 1 row of data has been pushed on, see FIG. 11.

The next step is to determine if ucount is less than ku (operation 160). If it is, then a u span has not been completed, so return to 150 (increment ucount) via line 161 in order to send more data to each parallel processor. If ucount is greater than or equal to ku, then a u span has been completed.

After a u span is complete, set $U_1$ equal to uknot (ucount) (operation 162) and $U_2$ equal to uknot (ucount+1) (operation 164).

The next step is to determine if the u span is valid (operation 166). The u span will be valid if:

$U_1 < Umax$ $U_2 > Umin$ and $U_2 > U_1$ where $U_1$ and $U_2$ are equal to the values given in the previous step and Umax and Umin are equal to the values previously stored in local memory. If the u span is invalid, then the flow passes to 255 (Is ucount<Nu) via line 168 in order to go to the next u span. If the u span is valid, then vsbl (ucount−ku+1) is compared to 1 (operation 170). If it is not equal to one then the uspan is not visible and the flow once again passes to 255 (increment ucount) via line 171. If it is equal to one, then send Qmin (ucount−ku+1) to each of the parallel processors (operation 172). As each parallel processor 16 receives Qmin, it will pass Qmin onto processor 18 (operation 174) and processor 18 will store it in a register.

Next, the u parametric coordinate interval, Du is calculated within the graphics control processor (operation 176) as follows:

$$Du = (U_2 - U_1)/Nustep$$

where Nustep is determined by:

(a) calculating the scale, s, which equals the ratio of screen (pixel) coordinates/data coordinates;

(b) converting dU (ucount-ku+1) into pixel units, which are device coordinates by multiplying dU (ucount-ku+1) by s yielding dU'; and (c) calculating Nustep where Nustep=Max (1, Int sqrt (dU'))

After the u parametric coordinate interval is calculated $U_1$ and $U_2$ will be adjusted in order to ensure the beginning and ending of a uspan are not outside the boundaries set by Umin and Umax (operation 178), as follows. If Umin is between $U_1$ and $U_2$, then $U_1$ will be set equal to Umin, and if Umax is between $U_1$ and $U_2$, then $U_2$ will be set equal to Umax.

Figure 4D:
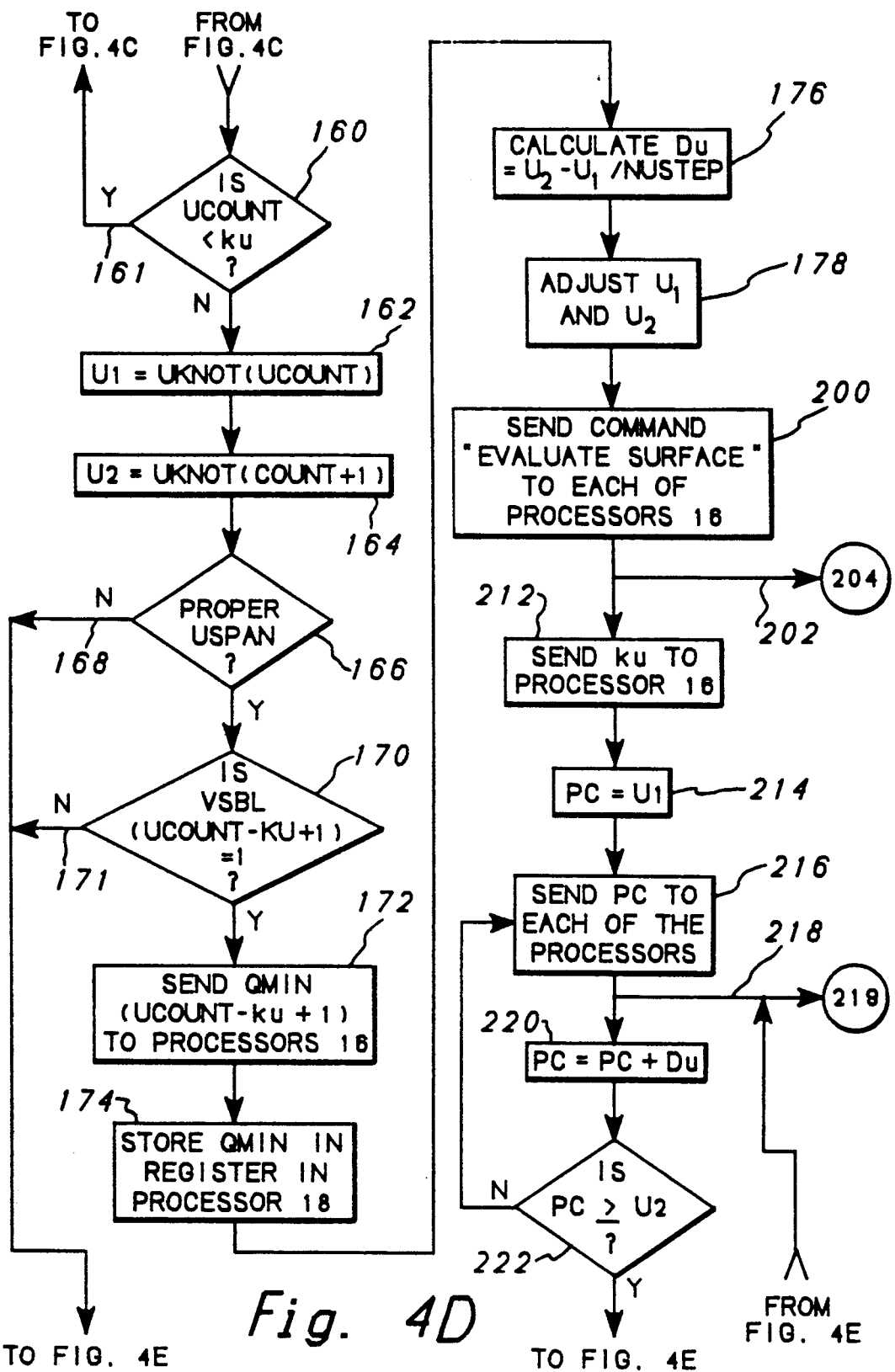
FIGS. 4G–4I present flowcharts of the operations within the parallel floating point processors and subsequent processors in accordance with the principles of the present invention.
Figure 4E:
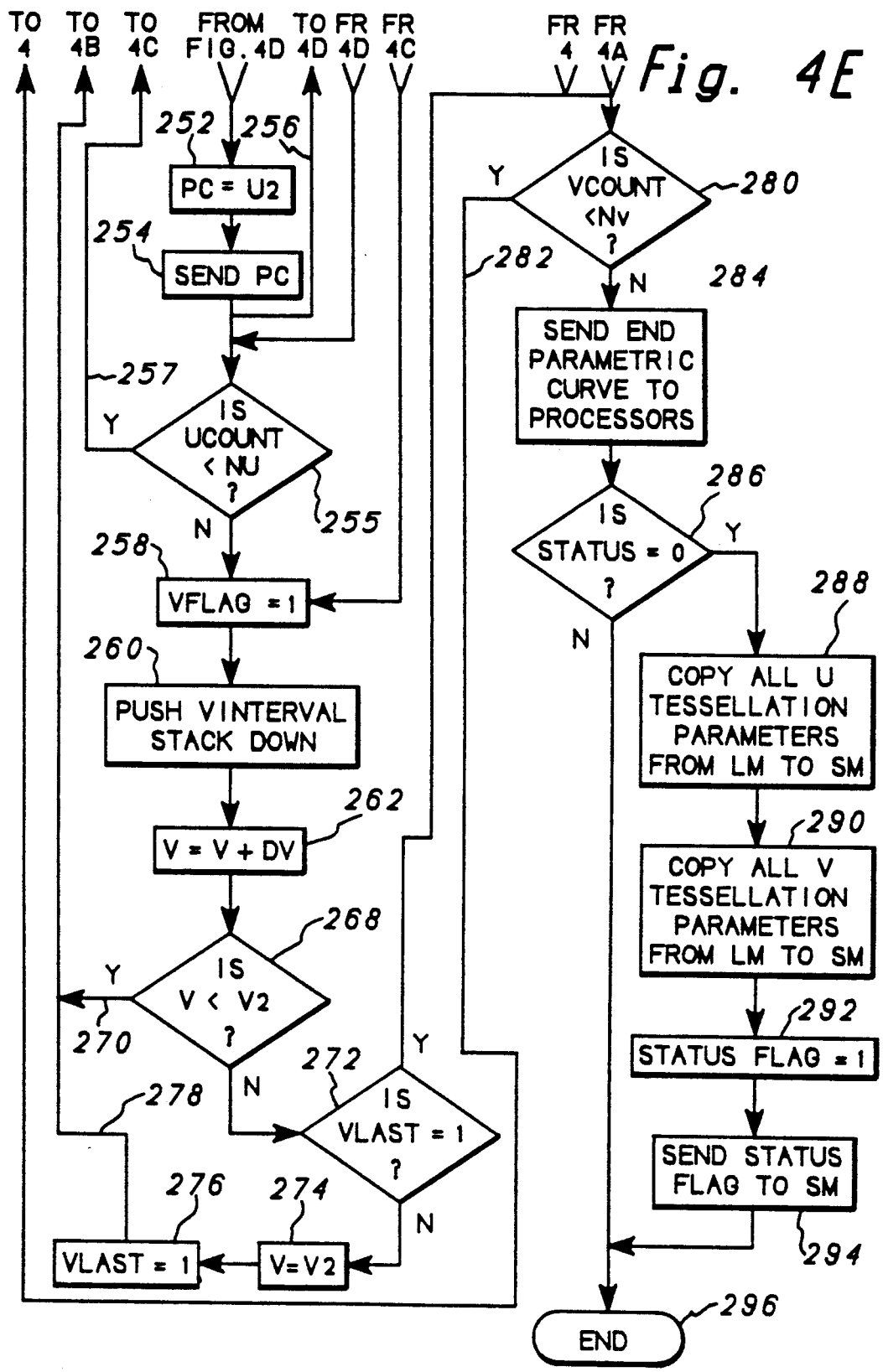

Next, the command "Evaluate Parametric Surface" will be sent to each parallel processor (16) (operation 200). When the parallel processors receive this command, they send the same command to processor (18), (operation 206) which then sets vflag=0 and PREV=-NONE (operation 210), indicating the start of a sequence of polygons. This is illustrated in FIG. 4F. While these operations are being performed, the graphics control processor continues to work. Line 202 in FIG. 4D illustrates that work is being performed in other processors simultaneously to the work being performed in the graphics control processor. The graphics control processor will then send the u order (ku) to each parallel floating point processor (operation 212).

Next, a register referred to as PC will be set equal to $U_1$, which represents the first u parametric point (operation 214). PC will then be sent to each parallel processor (operation 216).

The operations which take place within the parallel processors and the subsequent processors may best be understood by referring to the flowchart in FIG. 4G. The tasks in the flowchart in FIG. 4G are being performed simultaneously with the operations in the graphics control processor. This is indicated by line 218 in FIG. 4D.

At this stage of the inventive process, there exists a strip consisting of top and bottom coordinates and v derivatives. This strip extends along the u coordinate for the full length of the surface and is bounded in the v coordinate by two successive v parametric points. Generally, the next stage is to evaluate the b-spline functions which define the strip namely the top coordinate, top v derivative, bottom coordinate, and bottom v derivative based on successive u parameter points for each successive u span. FIG. 13 illustrates a strip and successive u spans divided into successive u intervals.

Referring to FIG. 4G, after the parameter point (PC) is received by the parallel floating point processors, each processor will begin evaluating the b-spline functions for one component of the control points coordinate set (wx,wy,wz,w) (operation 224). For example, the first parallel floating point processor will perform the evaluations for the x coordinate, the second parallel floating point processor will perform the evaluations for the y coordinate, and so forth. All four of the parallel floating point processors evaluate their respective coordinates simultaneously. For each coordinate, each processor will evaluate four b-spline functions: a top coordinate, a top v derivative, a bottom coordinate, and a bottom v derivative. From these four b-spline functions, six values will be yielded, which include the above-mentioned plus a top u derivative and a bottom u derivative.

The Cox DeBoor algorithm, which was previously explained, will be employed to evaluate each of the four b-spline functions. The top and bottom u derivatives will be calculated in the same manner that the top and bottom v derivatives were calculated. That is the top and bottom u derivatives will be derived from the top and bottom coordinates.

The six resulting values from each parallel process will be synchronously sent to processor (18) (operation 226). These values include a set of top coordinates (TWX,TWY,TWZ,TW), a set of top u derivatives (TWXU,TWYU,TWZU,TWU), a set of top v derivatives (TWXV,TWYV,TWZV,TWV), a set of bottom coordinates (BWX,BWY,BWZ,BW), a set of bottom u derivatives (BWXU,BWYU,BWZU,BWU) and a set of bottom v derivatives (BWXV,BWYV,BWZV,BWV).

Upon receiving each set of coordinates and derivatives as discussed above (operation 227), processor 18 performs various steps. First, TW=1/TW will be calculated and this value will be used in the subsequent calculations of the right vertex coordinates and right vertex tangents for the top coordinates and derivatives, respectively (operation 229).

The top right vertex coordinates are calculated as follows:

$$TRX = TWX \cdot TW$$

$$TRY = TWY \cdot TW$$

$$TRZ = TWZ \cdot TW$$

Therefore, the top coordinate TC=(TRX,TRY,TRZ).

The top right vertex u tangents are calculated as follows:

$$TRXU = (TWXU - TRX \cdot TWU)TW$$

$$TRYU = (TWYU - TRY \cdot TWU)TW$$

$$TRZU = (TWZU - TRZ \cdot TWU)TW$$

The top right vertex v tangents are calculated as follows:

$$TRXV = (TWXV - TRX \cdot TWV)TW$$

$$TRYV = (TWYV - TRY \cdot TWV)TW$$

$$TRXV = (TWZV - TRZ \cdot TWV)TW$$

Next, the top right vertex normals will be calculated by taking the cross product of the corresponding top u and v tangents (operation 230). For example, $$TNX = TRYU \cdot TRZV - TRZU \cdot TRYV$$

$$TNY = TRZU \cdot TRZV - TRXU \cdot TRZV$$

$$TNZ = TRXU \cdot TRYV - TRYU \cdot TRXV$$

Therefore, the surface normal vector TN=(TNX,TNY,TNZ).

Then, the magnitudes of the resulting vertex normals will be calculated by taking the sum of the squares of their x,y and z components, as follows:

$$TMP = TNX \cdot TNX + TNY \cdot TNY + TNZ \cdot TNZ$$

Next, the value in TMP will be compared to Qmin (operation 231). If TMP is less than Qmin then a bit in a register will be set to fail (operation 232), and if TMP is greater than or equal to Qmin then the bit will be set equal to pass (operation 233).

Then, the above procedure will be repeated for the bottom values in order to yield another pass or fail. BW=1/BW is calculated and then the bottom right vertex coordinates are calculated as follows (operation 234):

$$BRX = BWX \cdot BW$$

$$BRY = BWY \cdot BW$$

$$BRZ = BWZ \cdot BW$$

Therefore, the bottom coordinate BC=BRX, BRY, BRZ)

Then, the bottom right vertex u tangents are calculated as follows:

$$BRXU = (BWXU - BRX \cdot BWU)BW$$

$$BRXY = (BWYU - BRY \cdot BWU)BW$$

$$BRXZ = (BWZU - BRZ \cdot BWU)BW$$

The bottom right vertex v tangents are calculated as follows:

$$BRXV = (BWXV - BRX \cdot BWV)BW$$

$$BRYV = (BWYV - BRY \cdot BWV)BW$$

$$BRZV = (BWZV - BRZ \cdot BWV)BW$$

Next, the bottom right vertex normals will be calculated by taking the cross product of the corresponding bottom u and v tangents (operation 235). For example, $$BNX = BRYU \cdot BRZV - BVZU \cdot BRYV$$

$$BNY = BRZU \cdot BRZV - BRXU \cdot BRZV$$

$$BNZ = BRXU \cdot BRYV - BRYU \cdot BRXV$$

Therefore, the surface normal vector BN=(BNX,BNZ,BNZ).

Next, the value in BMP will be compared to Qmin (operation 236). If BMP is less than Qmin then a bit in a register will be set to fail (operation 237), and if BMP is greater than or equal to Qmin then the bit will be set equal to pass (operation 238).

Next, based on the two results of the above test and the value in PREV, two vectors, V1 and V2, will be assigned specific values. The values in these vectors are saved so that they may be used if the top and bottom of the current normal vector have failed the normal threshold test. The following chart summarizes what V1, V2, and PREV will be set to in certain circumstances. Top refers to the top of the surface normal vector, bottom refers to the bottom of the surface normal vector, PREV corresponds to the current value in PREV, copy explain what is to be copied under certain circumstances, save describes what to save in V1 and V2, and set explains what PREV should be set to under certain circumstances (operation 239).

| Top | Bottom | PREV | Copy | Save | Set |
| --- | --- | --- | --- | --- | --- |
| pass | pass | n/a | nothing | V1=TN, V2=BN | prev=ok |
| pass | fail | n/a | TN to BN | V1=TN, V2=BN | prev=ok |
| fail | pass | n/a | BN to TN | V1=TN, V2=BN | prev=ok |
| fail | fail | ok | TN=V1, BN=V2 | V1=TN, V2=BN | prev=ok |
| fail | fail | none | nothing | V1=TC, V2=BC | prev=bad |
| fail | fail | bad | TN=BN=(0, 0, 1) | V1=TC, V2=BC | prev=bad |

Figure 4H:
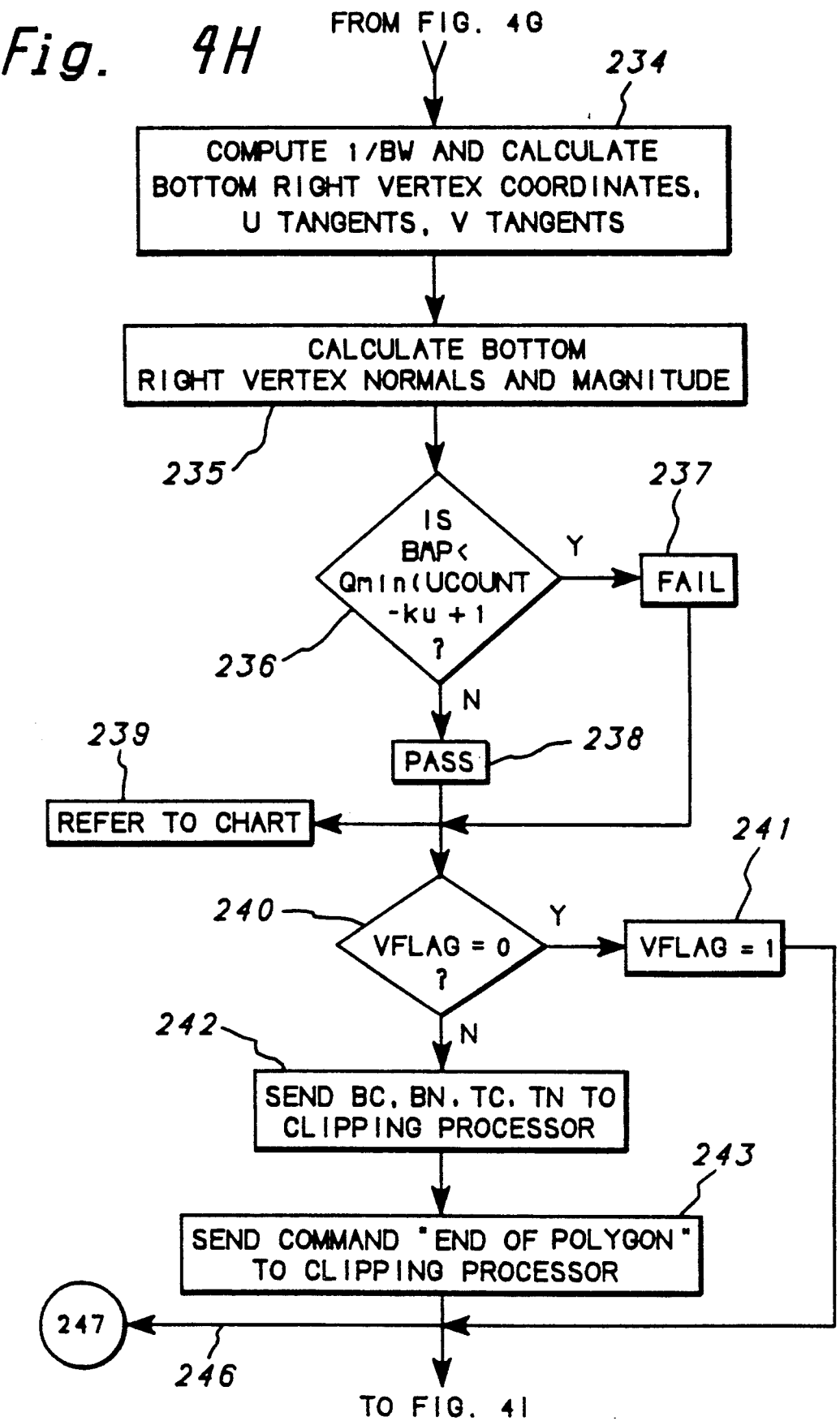

Then, the status of vflag is examined (operation 240). If vflag is equal to 0 then vflag is set equal to 1 (operation 241) and the flow skips to 245 (wait for more data). If vflag is equal to one, then the bottom coordinate, BC, bottom normal, BN, top coordinate, TC, and top normal, TN are sent to the clipping processor (operation 242). This is followed by the command "End of Polygon" (operation 243). The clipping processor, then performs several operations. These steps are performed simultaneously to the work being performed in processor 18. This is illustrated by line 246 in FIG. 4H.

Figure 4I:
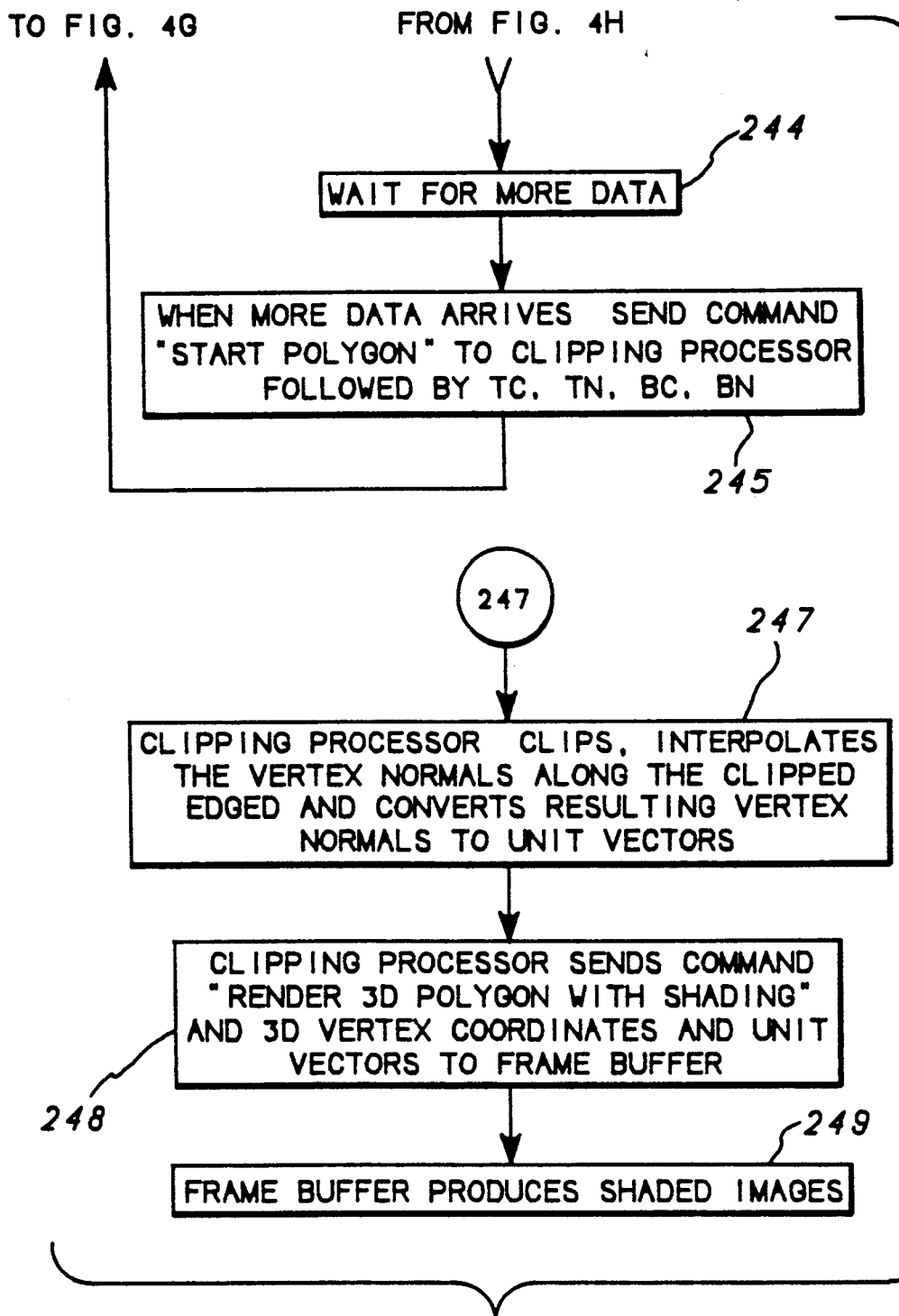

The operations in the clipping processor may best be understood by referring to FIG. 4I. The clipping processor will clip the polygon just received from processor 18 against the current 3-dimensional viewing window, interpolate the vertex normals along the clipped edges and then, convert the resulting vertex normals to unit vectors, in a conventional manner (operation 247).

Then, if any portion of the original polygon remained within the viewing window after the clipping process was complete, processor 18 would send the command "Render 3d polygon with shading" to the frame buffer (22). Processor 18 would also send the resulting vertex coordinates and vertex normals (operation 248).

Next, the frame buffer will produce shaded images of the polygon (operation 249).

While the operations are being performed in the clipping processor and frame buffer, processor 18 continues to process. After processor 18 sends the command "End of Polygon" to the clipping processor (20), it waits for more data (operation 244). Then, when more data arrives, processor 18 sends the command "Start Polygon" followed by a top coordinate (TC), top normal (TN), bottom coordinate (BC) and bottom normal (BN) to the clipping processor (operation 245).

Next, the flow returns to 227 (processor 18 receives data) and the process is repeated until there is no more data or processor 18 receives any command.

Referring again to FIG. 4D, while the evaluation and other processes are being performed in the parallel floating point processors (16), and other processors, the graphics control processor continues calculating parametric points. At 220 in FIG. 4D, PC is incremented by Du. Then, PC is compared to $U_2$ (operation 222), and if PC is less than $U_2$, then PC will be sent to each of the parallel floating point processors. If PC is greater than or equal to Uz, then PC is set equal to $U_2$ (operation 252), and is then sent to each of the parallel processors. After this value is sent to the parallel floating point processors and is evaluated, all the u parameter points for a given u span have been evaluated. The next step is to determine if there are more u spans (operation 255). If ucount is less than Nu, then there are more u spans and the flow returns to 150 via line 257. If ucount equals Nu, then there are no more u spans.

At this point, vflag is set equal to one, which represents the state at not being at the start of the current v span (operation 258). Then, the values within the v interval stack are pushed down (operation 260). This stack as previously described contains the top coordinates, top v derivatives, bottom coordinates, and bottom v derivatives for each x,y,z,w coordinate of a u dimension (Nu). For an illustration of the v interval stack at this point see FIG. 10b. At this particular point, the entries for the top coordinates and derivatives are equal to the corresponding bottom values.

Next, the v parametric interval is incremented by Dv and V is compared to $V_2$ (operation 268). If V is less than $V_2$, then the next v interval will be evaluated yielding another top edge of a strip and the flow will return to 122 (increment ucount) via line 270. If V is greater than or equal to $V_2$, then vlast is examined (operation 272). If vlast is not equal to one, then V is set equal to $V_2$ (operation 274), vlast is set equal to 1, which indicates the end of the v interval loop, (operation 276), and the flow returns to 122 (increment ucount) via line 278. If vlast is equal to 1, then vcount is compared to Nv (operation 280). If vcount is less then Nv, then the next v span will be evaluated and the flow returns to 64 (read one row of control points) via line 282. If vcount is greater than or equal to Nv, then the command "End Parametric Surface" will be sent to each parallel floating point processor (16).

The next step is to check the status flag (operation 286). If it equals 0, then all the u and v tessellation parameters will be copied from local memory within the graphics control processor to system memory (operations 288, 290). Next, the status flag will be updated to one (operation 292) and will be stored in system memory (operation 294). This signifies that dU and dV parameter valves have already been calculated, and thus do not have to be recalculated, if this surface is evaluated and rendered again. If the status flag does not equal zero, then no further operations need to be performed.

An apparatus and method for evaluating and rendering parametric surfaces based on non-uniform rational b-splines (NURBS) using parallel and pipelined processors have been described herein. The deliberate use of processors in a parallel and pipelined manner enable surfaces to be evaluated and rendered much more quickly than in the past. Also, the particular method chosen permits the elimination of data redundancy and facilitates the efficient processing of the data.

NURBS because of their inherent characteristics provide many advantages, and the present invention fully utilizes those advantages. NURBS allow surfaces to be divided into an array of patches, in which each patch is represented by a different set of parametric polynomials. The parametric polynomials which describe adjacent patches of a NURBS surface provide a specific degree of continuity. The degree of continuity may be controlled so that a smooth surface or a surface with sharp corners may be drawn. The ability to match successive spans with a specified degree of continuity enables the construction of a complex surface passing through many points using low order NURBS. This property is extremely valuable because it makes it possible to avoid high order functions, which are usually costly to evaluate and prone to numerical instabilities.

Local control is one characteristic of NURBS. Since NURBS are determined by control points, weights and knot vectors, it is possible to alter a patch of the surface by moving a control point without affecting the whole patch. Each control point for a surface with orders ku and kv affects up to ku x kv patches.

The convex hull property offers further advantages. NURBS surfaces are contained within the convex hull of their control points. The convex hull is the smallest convex polygon (for a 2-dimensional case) or the smallest convex polyhedron (for a 3-dimensional case) which contains a given set of points. Each patch of a surface must lie within the convex hull of the ku by kv control points which determine that patch. This characteristic makes it possible to make estimates of and place bounds on the size and location of a NURBS surface without evaluating any points. This is particularly important in trivial rejection testing. In other words, if the convex hull does not overlap with the current screen, then the surface is not evaluated and it is rejected. This will have a large effect on the performance of a system when a user zooms in for a detailed view of a small portion of a complex scene or object. If the surface is not rejected, then the convex hull may be used to determine the points at which the surface is evaluated. This is most useful on a pipelined architecture where several processors are used to evaluate the parametric functions, and the processor which selects the points for evaluation does not have access to the results of this evaluation.

The weights associated with the control points provide exact representations of quadric surfaces, which include such geometric forms as cylinders, cones, and spheres. This is a particularly important advantage since these classes of surfaces are essential for geometric modelling.

A further advantage of this invention is that transformations are accomplished using control points rather than vertices of polygons used to represent a surface. Since there are usually fewer control points than polygon vertices, this method is more economical. Also, the transformed control points may be used for trivial rejection based on the convex hull property, which was previously discussed.

The evaluation technique employed by the present invention uses the control points directly which results in reduced set-up cost compared to other methods, such as those based on the forward difference method. The interpolation formulas preserve the numerical stability of the NURBS functions, and each point is computed independently, so there are no cumulative errors as the calculations progress across each span. Consequently, the last point on a surface will be just as accurate as the first, and each span will match the next with maximum accuracy, ensuring that the representation of the surface does not have holes or other errors at patch boundaries.

The tessellation technique employed by the present invention, namely systematically tessellating each surface as a single entity, avoids the creation of pinholes (isolated missing pixels) or rips (sequences of missing pixels) in a surface.

Furthermore, utilizing the NURBS form with traversal time tessellation will yield a larger number of objects per second updated on the screen. Because a surface can be evaluated and converted into polygons at a rate comparable to the rate at which they can be filed, there is no need to save the resulting polygons in system memory, mass storage, or anywhere else. Every time the screen is updated, each surface is converted into polygons. The resulting polygons are each filled (with shading, lighting and hidden surface removal) and then discarded. This makes it possible to have traversal time tessellation in which the set of polygons chosen to represent each surface may be optimized to meet the instantaneous requirements of each instance of the surface.

NURBS surfaces form very compact data structures resulting in significantly improved data transfer rates, better use of system resources and the ability to support more complex graphics, as compared to the traditional polygon data. For example, the amount of data required to represent an object with NURBS is 10 to 100 times smaller than that required to represent the same object with polygons. These advantages are preserved by processing the NURBS data in its original form and enhanced by the span sharing data sequencing approach of the present invention.

As can be seen from the foregoing, the apparatus and method for evaluating and rendering parametric surfaces based on NURBS, disclosed herein, have many advantages, which include high performance, good numerical stability, traversal time tessellation, cost effectiveness, high speed and accuracy, greater control over the surfaces, compatibility with the proposed PHIGS PLUS standard for interactive 3-dimensional graphics, and the elimination of data redundancy.

Although a preferred embodiment has been depicted and described in detail herein, it will be apparent to those skilled in the relevant art that various modifications, additions, substitutions and the like can be made without departing from the spirit of the invention, and these are therefore considered to be within the scope of the invention as defined by the appended claims.

What is claimed is:

1. A method of converting NURBS data representative of a parametric surface into geometric coordinates and associated surface normal vectors of vertices of polygons for subsequent rendering on the screen of a computer graphics display system, the surface having one edge extending along a u parametric coordinate for Nu-ku+1 successive u spans where Nu is the dimension and ku is the order along the u coordinate and a second edge extending along an orthogonal v parametric coordinate for Nv-kv+1 successive v span where Nv is the dimension and kv is the order along the v coordinate, the general geometry of the surface being defined by a matrix of Nv rows of Nu columns of control points, comprising the steps of:

(a) placing steps of view coordinates for the first kv successive rows of Nu control points of said matrix into a control point stack having kv rows and Nu columns so that the stack contains all of the control points for an initial v span;

(b) converting the view coordinates to homogeneous coordinates and evaluating the b-spline function of sets of coordinates in each column of said stack for an initial v parameter point and a successive v parameter point to obtain a series of Nu bottom coordinates and Nu bottom v derivatives, and a series of Nu top coordinates and Nu top v derivatives, respectively, for a first strip extending fully across the surface along the u coordinate and bounded in the v coordinate by said initial v parameter point and said successive v parameter point;

(c) evaluating the b-spline functions of the top coordinates, top v derivatives, bottom coordinates and bottom v derivatives at successive u parameter points for each successive u span of the first strip to obtain values for the u dependence of the top and bottom coordinates, for the top and bottom u derivatives and for the u dependence of the top and bottom v derivatives for each of said successive u parameter points;

(d) converting the values obtained from the preceding evaluation step into a set of geometric coordinates and a vertex normal for a top point and a bottom point of said strip for each u parameter point, the top and bottom points for each u parameter point in conjunction with the top and bottom points for an immediately succeeding u parameter point defining a 4-sided polygon to be subsequently rendered; and (e) repeating steps (b)–(d) for additional successive v parameter points of said initial v span, and repeating steps (a)–(d) for successive v spans of the surface; and (f) generating a shaded image of said polygons from the geometric coordinates and surface normal vectors of the points defining said polygons to render said surface on said screen.

2. The method of claim 1 wherein the top coordinates and top v derivatives of a strip are employed as the bottom coordinates and bottom v derivatives in evaluation step (c) for an immediately succeeding strip.

3. The method of claim 1 wherein an initial u span of the surface is defined by ku columns of the stack and each successive u span is defined by a successive column and the immediately preceding ku-1 columns;

wherein the initial v span of the surface is defined by the first kv successive rows of said matrix and each successive v span is defined by a corresponding successive row of said matrix and the kv-1 immediately preceding rows;

wherein said stack operates on a first in-first out row basis; and further comprising the step of pushing a corresponding successive row of the matrix into the top of the stack for each successive v span.

4. The method of claim 1 wherein the control points in said matrix are represented in modelling coordinates and each control points has a weight w associated therewith; and further comprising the steps of:

transforming the control points modelling coordinates to view coordinates;

multiplying the transformed coordinates of a control point by its associated weight to thereby convert the new coordinates to a set of homogeneous coordinates for each control point; and calculating a v parametric coordinate interval for each v span and generating therefrom a series of v parameter points for the v span, successive v parameter points being spaced apart by said v coordinate interval.

5. The method of claim 4 further comprising the step of:

calculating a u parametric coordinate interval for each u span of a strip and generating therefrom a series of u parameter points for said u span, successive u parameter points being spaced apart by said u interval; and wherein evaluation step (c) is implemented with four parallel floating point processors simultaneously evaluating the b-spline functions for a different one of the wx, wy, wz and w coordinate set.

6. The method of claim 1 wherein the values obtained in evaluation step (c) have a weight w associated therewith and wherein converting step (d) comprises:

eliminating the weight w from the values obtained in evaluation step (c) to yield a set of geometric coordinates and a u tangent and a v tangent for the top point and bottom point of said strip for each u parameter point;

computing a vertex normal by taking the cross product of the u and v tangents for each of said top and bottom points; and computing the magnitudes of the vertex normals.

7. The method of claim 1 wherein evaluation steps (b) and (c) employ the Cox-DeBoor process.

8. The method of claim 1 further comprising the step of comparing the magnitude of the vertex normal at each top and bottom point to a normal threshold, and when the magnitude is less than said threshold replacing the vertex normal vector for that point with a normal vector from an adjacent point.

9. The method of claim 1 further comprising the step of determining the visibility of each u span within each v span.

10. The method of claim 1 further comprising the steps of:

clipping each polygon of step (d) against a current 3-dimensional viewing window;

interpolating the vertex normals along clipped edges; and converting the interpolated vertex normals to unit vectors for subsequent rendering.

11. The method of claim 1 wherein said parametric surface is an untrimmed parametric surface.

12. A method of converting NURBS data representative of a parametric surface to geometric coordinates and associated surface normal vectors of vertices of polygons for subsequent rendering on the screen of a computer graphics display system, the surface having one edge extending along a u parametric coordinate for an Nu-ku+1 plurality of successive u spans where Nu is the dimension and ku is the order along the u coordinate and a second edge extending along an orthogonal v parametric coordinate for an Nv-kv+1 plurality of successive v spans where Nv is the dimension and kv is the order along the v coordinate, the u spans and v spans dividing the surface into a number of patches each of which is define by a different polynomial function, comprising the steps of:

tessellating the surface into successive parallel strips, each strip having a bottom edge located at a bottom v parameter value and a top edge located at a top v parameter value, said edges extending along the u coordinate fully across the surface, the top edge of a strip being coincident with the bottom edge of the immediately succeeding strip, each v span comprising multiple such strips;

tessellating each u span of each strip at successive u parameter values to determine a pair of points, one on the top edge and the other on the bottom edge of the strip, associated with each of said u parameter values, each strip of said surface being tessellated at the same u parameter values;

determining through b-spline evaluation, using at least one polynomial function corresponding to each of said successive u spans, the geometric coordinates and surface normal vector for each point of each pair, each pair of points of a strip and the immediately succeeding pair of points of the strip defining the vertices of a polygon; and generating a shaded image of said polygons from the geometric coordinates and surface normal vectors of the points defining the vertices of said polygons to render said surface on said screen.

13. The method of claim 12 wherein:

the step of determining the geometric coordinates and surface normal vector is applied at successive u parameter values along a first strip having a bottom edge coincident with the one edge of the surface and then at successive u parameter points of each successive strip; and further comprising the steps of:

determining a v parameter interval for each v span and generating a series of v parameter values therefrom, successive v parameter values being spaced apart by said v parameter interval; and determining a u parameter interval for each u span of each strip and generating a series of u parameter values therefrom, successive u parameter values being spaced apart by said u parameter interval.

14. The method of claim 12 wherein the general geometry of the surface is defined by a matrix of Nv rows of Nu columns of control points; and wherein the step of determining the geometric coordinates and surface normal vector comprises:

determining a series of bottom coordinates and bottom v derivatives for the bottom edge of a strip of a particular v span by evaluating at the bottom v parameter value of the strip the b-spline function with control points in each column of kv rows of said matrix, said kv rows being associated with said particular v span;

determining a series of top coordinates and top v derivatives for the top edge of said strip by evaluating at the top v parameter value of the strip the b-spline function with the control points in each column of said kv rows associated with said particular v span;

evaluating the b-spline functions of the top coordinates, top v derivatives, bottom coordinates, and bottom v derivatives at successive u parameter values for each successive u span of the strip to obtain values for the u dependence of the top and bottom coordinates, for the top and bottom u derivatives and for the u dependence of the top and bottom v derivatives for each of said successive u parameter values; and converting the values obtained from the preceding evaluation step into a set of geometric coordinates and a vertex normal for a top point and a bottom point of the strip for each u parameter value.

15. The method of claim 12 wherein the step of determining the geometric coordinates and surface normal vector is performed for all u parameter values of all u spans of a strip before such step is performed for u parameter values of an immediately succeeding strip.

16. The method of claim 12 wherein said parametric surface is an untrimmed parametric surface.

17. The method of claim 12 wherein the b-spline evaluation uses a set of polynomial functions that are determined by a set of u knot values corresponding to each of said successive u spans.

18. Apparatus for converting NURBS data representative of a parametric surface into geometric coordinates and associated surface normal vectors of vertices of polygons for subsequent rendering on the screen of a computer graphics display system, the surface having one edge extending along a u parametric coordinate for Nu-ku+1 successive u spans where Nu is the dimension and ku is the order along the u coordinate and a second edge extending along an orthogonal v parametric coordinate for Nv-kv+1 successive v spans where Nv is the dimension and kv is the order along the v coordinate, the general geometry of the surface being defined by a matrix of Nv rows of Nu columns of control points, comprising:

first memory means for storing NURBS data representative of a parametric surface to be rendered, said data including a set of modelling coordinates and an associated weight w for each control point of the matrix;

graphics control processor means for transforming the control points modelling coordinates to view coordinates, converting the transforming coordinates to homogeneous coordinates, and evaluating the b-spline function of said homogeneous coordinates at successive v parameter values to obtain top coordinates and top v derivatives for a current v parameter value and bottom coordinates and bottom v derivatives for an immediately preceding v parameter value;

a plurality of parallel floating point processors for receiving data and commands from said graphics control processor means and simultaneously evaluating the b-spline functions of the top and bottom coordinates and top and bottom v derivatives, at successive u parameter values, on a per coordinate basis, to obtain values for the u dependence of the top and bottom coordinates, the top and bottom u derivatives and the top and bottom u dependence on the top v derivatives for each of said successive u parameter values; and a further floating point processor for receiving the values obtained by said parallel floating point processors and converting said values into a set of geometric coordinates and a vertex normal for vertices of polygons to be rendered.

19. The apparatus of claim 18 wherein said graphics control processor means, plurality of floating point processors, and further floating point processor operate in pipeline fashion.

20. The apparatus of claim 18 wherein the plurality of floating point processors comprises:

four processors, one of which provides an output representative of the weight for each of said u parameter values; and wherein the further floating point processor multiplies the outputs of the other of said parallel floating point processors by the reciprocal of the output of said one floating point processor.

21. The apparatus of claim 18 wherein the parallel floating point processors and graphics control processor means employ the Cox-DeBoor process for evaluation; and the outputs of the individual floating point processors of said plurality are provided sequentially to said further floating point processor.

22. The apparatus of claim 18 further comprising a FIFO control points stack associated with the graphics control processor means, the stack having kv rows and Nu columns to accommodate the kv rows of control points of the matrix defining a v span; and wherein the graphics control processor means loads an individual successive row of said matrix into the top of said stack to define each successive v span of the surface.

23. The apparatus of claim 18 wherein said graphics control processor means:
determines a v parametric coordinate interval for each v span and generates therefrom a series of successive v parameter values separated by said v interval; and
determines a u parametric coordinate interval for each u span and generates a series of successive u parameter values separated by said u interval.

24. The apparatus of claim 18 further comprising a clipping processor and a frame buffer connected in series to an output of said further floating point processor and operating in pipeline fashion therewith.

25. The apparatus of claim 18 wherein said parametric surface is an untrimmed parametric surface.

* * * * *